US010798801B2

(12) United States Patent
Lal

(10) Patent No.: US 10,798,801 B2
(45) Date of Patent: Oct. 6, 2020

(54) UNIVERSAL SMART SWITCH MANAGEMENT

(71) Applicant: Charter Communications Operating, LLC, St. Louis, MO (US)

(72) Inventor: Dhananjay Lal, St. Louis, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 234 days.

(21) Appl. No.: 16/019,292

(22) Filed: Jun. 26, 2018

(65) Prior Publication Data

US 2019/0394858 A1 Dec. 26, 2019

(51) Int. Cl.
*H05B 47/175* (2020.01)
*H04L 12/28* (2006.01)
*H05B 47/12* (2020.01)

(52) U.S. Cl.
CPC ....... *H05B 47/175* (2020.01); *H04L 12/2818* (2013.01); *H05B 47/12* (2020.01)

(58) Field of Classification Search
CPC ............ H05B 37/0227; H05B 37/0245; H05B 37/0272; H05B 37/0281
USPC ......................................... 315/307, 312, 360
See application file for complete search history.

(56) References Cited

U.S. PATENT DOCUMENTS 8,598,978 B2 * 12/2013 Knode .................. H04L 12/282 340/3.7
2006/0284734 A1 * 12/2006 Newman, Jr. .......... H05B 47/19 340/2.24
2011/0012532 A1 * 1/2011 Barnett ............... E05D 11/0081 315/294
2012/0112654 A1 * 5/2012 Choong .................... G05F 3/08 315/291
2013/0010018 A1 * 1/2013 Economy ............. H04N 5/2256 345/691
2014/0175875 A1 * 6/2014 Newman, Jr. ........... H04L 12/66 307/18
2015/0332586 A1 * 11/2015 Hamm .................. G08C 17/02 340/12.5
2015/0342011 A1 * 11/2015 Brochu .................. H05B 33/08 315/294
2016/0338179 A1 * 11/2016 Aliakseyeu ............ H05B 45/10
2017/0277147 A1 * 9/2017 De Vaan .................. F24F 11/30
2018/0168019 A1 * 6/2018 Baker .................... H05B 45/10

* cited by examiner

*Primary Examiner* — Tung X Le
(74) *Attorney, Agent, or Firm* — The Marbury Law Group, PLLC

(57) ABSTRACT

Embodiments include systems and methods for controlling a smart lighting device. In embodiments, a processor of a smart switch may send to a customer service provider server device a smart switch identifier of the smart switch for incorporation into a data record in the customer service provider server device in association with a smart lighting device identifier of a smart lighting device at a customer premises. The processor of the smart switch may generate a lighting device instruction for a smart lighting device that may include the smart switch identifier. The processor of the smart switch may send to the customer service provider server device the generated smart lighting device instruction to the smart lighting device for transmission to the smart lighting device identifier based on the association.

47 Claims, 11 Drawing Sheets

UNIVERSAL SMART SWITCH MANAGEMENT

BACKGROUND

Lighting devices that include wireless communication capabilities ("smart lighting devices") are becoming increasingly ubiquitous, especially within the distributed network of computing devices generally referred to as the Internet of Things (IoT). Common residential and commercial computer networks served by a local access point (such as a Wi-Fi access point) increasingly include smart lighting devices. However, manufacturers of extant smart lighting devices provide proprietary systems that only function with components provided by such manufacturer, in order to lock consumers into the manufacturer's proprietary system of products. Thus, typically only the control devices and the smart lighting devices provided by the same manufacturer may be used together.

Further, smart lighting devices may typically be controlled by a control application running on a mobile computing device or accessible through a voice-activated control device. However, such controls for a smart lighting device introduce complexity and delay. For example, turning a smart lighting device on or off using a mobile computing device application may require unlocking the mobile computing device, launching the application, selecting the smart lighting device, and issuing a command to the smart lighting device from the application. As another example, voice-activated control systems may require substantial set-up and configuration, and furthermore require a user to speak loudly and clearly to control the smart lighting device, which may wake up or annoy others.

SUMMARY

Various embodiments include systems and methods of controlling a smart lighting device based on a control signal or lighting instruction from a smart switch deployed in a customer premises.

Various embodiments may include sending, by a processor of a smart switch, to a customer service provider server device a smart switch identifier of the smart switch for incorporation into a data record in the customer service provider server device in association with a smart lighting device identifier of a smart lighting device at a customer premises; generating a smart lighting device instruction for a smart lighting device, wherein the generated smart lighting device instruction includes the smart switch identifier, and sending the generated smart lighting device instruction to the smart lighting device for transmission to the smart lighting device identifier based on the association.

In some embodiments, the smart switch may be disposed to substantially cover a wall switch at the customer premises. In some embodiments, the smart switch may further include a receptacle portion formed to maintain a position of the wall switch in a powered-on position. In some embodiments, the smart switch may further include a physical switch coupled to the processor, and generating a smart lighting device instruction for a smart lighting device, wherein the generated smart lighting device instruction includes the smart switch identifier, may include generating an actuation signal for the smart lighting device in response to an input at the physical switch to enable the customer service provider server device to generate the smart lighting instruction for the smart lighting device.

In some embodiments, generating a smart lighting device instruction for a smart lighting device, wherein the generated smart lighting device instruction includes the smart switch identifier, may further include obtaining a status of the smart lighting device, and generating a smart lighting device instruction for the smart lighting device based on the obtained status of the smart lighting device. In some embodiments, obtaining a status of the smart lighting device may include obtaining a status of the smart lighting device from a second smart switch.

Some embodiments may further include receiving from the customer service provider server device a smart lighting device status responsive to the smart lighting instruction, and updated the data record with the smart lighting device status. Some embodiments may further include sending the smart lighting device status with one or more other devices associated with the smart lighting device. Some embodiments may further include performing N-way control operations.

Various embodiments may include generating, by a processor of a customer service provider service device, a data record that includes a smart switch identifier of a smart switch at a customer premises, generating an association between the smart switch identifier and a smart lighting device identifier of a smart lighting device at the customer premises, storing the smart switch identifier and the association in a data record in the memory, receiving from the smart switch a smart lighting device instruction including the smart switch identifier, obtaining the smart lighting device identifier from the memory based on the association, and sending the smart lighting instruction to the smart lighting device based on the smart lighting device identifier obtained based on the association.

In some embodiments, the smart lighting device instruction received from the smart switch may include an actuation signal, and sending the smart lighting instruction to the smart lighting device based on the smart lighting device identifier obtained based on the association may include obtaining a status of the smart lighting device, and generating and sending the smart lighting instruction to the smart lighting device based on the actuation signal and the obtained status of the smart lighting device.

Some embodiments may further include receiving from the smart switch a registration message including an indication of the smart lighting device with which the smart switch is to be associated, sending to a lighting service provider server device the indication of the smart lighting device, and receiving the smart lighting device identifier from a lighting service provider server device based on the indication of the smart lighting device. In some embodiments, receiving the smart lighting device identifier from a lighting service provider server device based on the indication of the smart lighting device may include receiving a plurality of smart lighting device identifiers from the lighting service provider server device based on the indication of the smart lighting device.

In some embodiments, generating the association between the smart switch identifier and a smart lighting device identifier of a smart lighting device at the customer process may include generating the association between the smart switch identifier and the plurality of smart lighting device identifiers. Some embodiments may further include receiving from the smart switch a registration message including an indication of a location of the smart switch in the customer premises, sending to a lighting service provider server device the indication of the smart switch location in the customer premises, and receiving the plurality of smart lighting device identifiers from the lighting service provider server device based on the indication of the smart switch location in the customer premises.

Some embodiments may further include receiving from the smart switch a registration message including an indication of the smart lighting device with which the smart switch is to be associated, and receiving a plurality of smart lighting device identifiers from a lighting service provider server device based on the indication of the smart lighting device. Some embodiments may further include receiving a smart lighting device status in response to sending the smart lighting instruction to the smart lighting device, determining based on the association in the data record the smart switch identifier, and sending the smart lighting device status to the determined associated smart switch. Some embodiments may further include sending the smart lighting device status to one or more other devices associated with the smart lighting device.

In some embodiments, storing the smart switch identifier and the association in a data record in the memory may further include storing the smart switch identifier and the association in a data record comprising one or more of a plurality of smart switch identifiers and a plurality of associations. Some embodiments may include performing N-way control operations.

Further embodiments may include a smart switch including a communication interface, a memory, and a processor coupled to the communication interface and the memory and configured with processor-executable instructions to perform operations of the methods described above. Further embodiments may include a customer service provider server device including a communication interface, a memory, and a processor coupled to the communication interface and the memory and configured with processor-executable instructions to perform operations of the methods described above. Further embodiments may include processor-readable storage media on which are stored processor executable instructions configured to cause a controller of a smart switch to perform operations of the methods described above. Further embodiments may include processor-readable storage media on which are stored processor executable instructions configured to cause a controller of a customer service provider server device to perform operations of the methods described above. Further embodiments may include a smart switch including means for performing functions of the methods described above. Further embodiments may include a customer service provider server device including means for performing functions of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of some embodiments.

DETAILED DESCRIPTION

Figure 1:
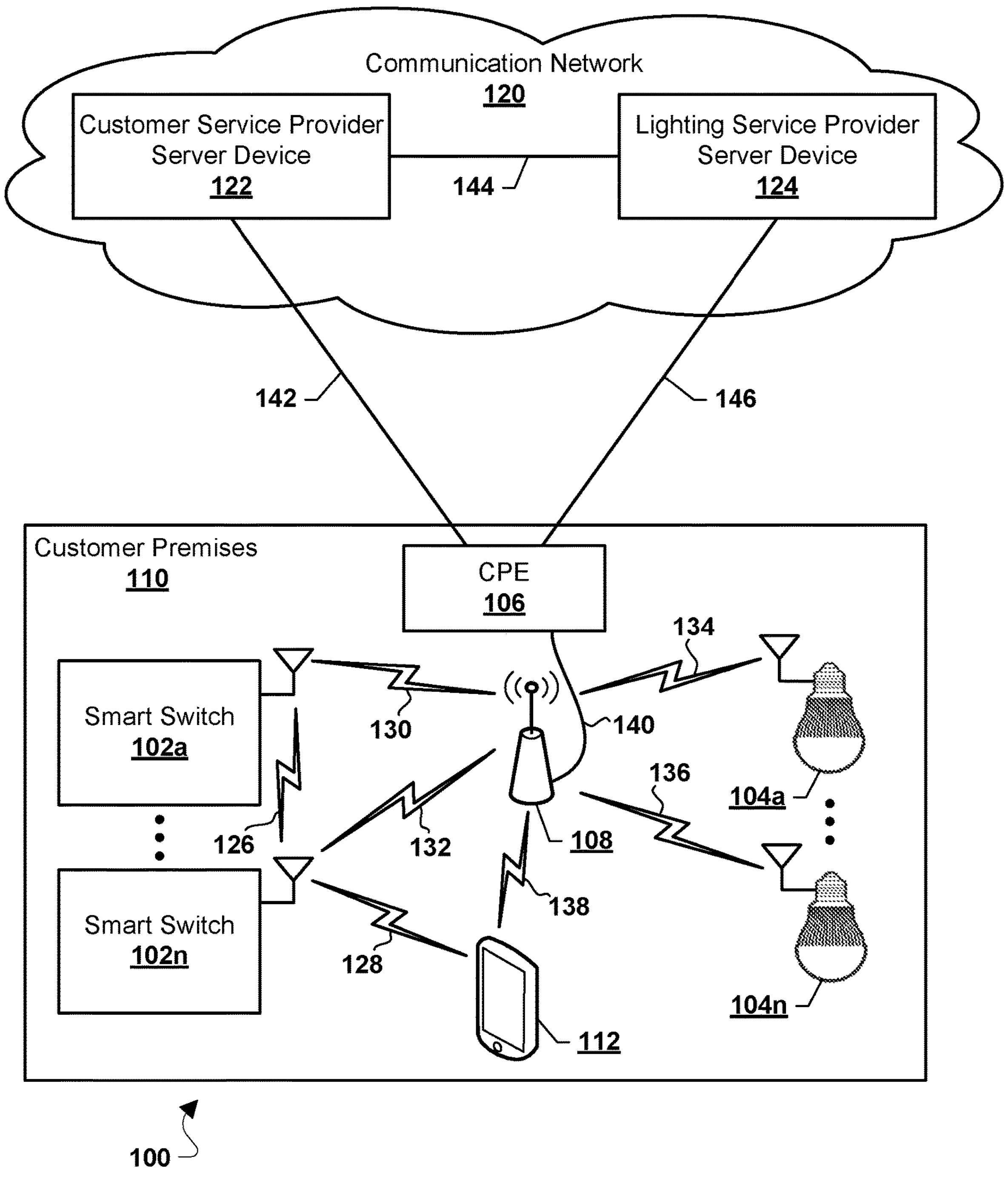
FIG. 1 is a communication system block diagram of a communication system suitable for use with some embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

The terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Conventional home control systems (such as smart lighting systems) typically include devices that are designed by a manufacturer around proprietary systems that only function with components provided by such manufacturer, in order to lock consumers into the manufacturer's proprietary systems and products. Further, in many cases device manufacturers control access to the devices (e.g., smart lighting devices) via a server provided by the manufacturer. For example, a command intended for a device to be controlled (e.g., a specific smart lighting device) may be provided (e.g., spoken to, input to, etc.) to a control unit (e.g., a "smart speaker" device, such as the "Echo" device provided by Amazon.com, Inc., the "Google Home" device provided by Google LLC, and other similar devices). Upon receipt of a command intended for the device to be controlled by the control unit, the control unit may relay the device command to a router or another customer premises device. The customer premises device, and in some cases network access itself, may be provided by a customer service provider (e.g., Charter Communications, Inc.). The customer premises device may relay the device command to a network device (such as a server device) of the control unit provider (e.g., Amazon.com, Inc., Google LLC, etc.). The control unit provider's network device may relay the device command to a network device (e.g., a server device) of the provider of the device to be controlled (e.g., a lighting device provider, such as Lutron Electronics Co., Inc., Koninklijke Philips N.V., General Electric, etc.). The device provider's server device may identify the device to be controlled (e.g., the specific smart lighting device), and may send the device command back to the customer premises device. The customer premises device may receive the device command, and route the device command to the device to be controlled (e.g., the specific smart lighting device). Feedback or other information from the device under control back to the control unit may follow a reverse pathway.

However, the typical smart home control unit introduces complexity, delay, an inconvenience to the previously simple and quiet process of turning on a light using a physical wall switch. For example, turning a smart lighting device on or off using a mobile computing device application may require unlocking the mobile computing device, launching the application, selecting the smart lighting device, and issuing a command to the smart lighting device from the application. As another example, voice-activated control systems may require substantial set-up and configuration, and furthermore require a user to speak loudly and clearly to control the smart lighting device, which may wake up or annoy others. One aspect that is lost with the typical smart home control unit is the tactile control, simplicity, speed, and convenience of a wall switch.

Various embodiments provide methods and systems configured to implement the methods of configuring and controlling smart switches and smart lighting devices via a universally configurable management system.

In some embodiments, a smart switch may be deployed in a customer premises. The smart switch may include a device that is configurable to control one or more smart lighting devices. In some embodiments, the smart switch may include a physical interface such as a tactile switch (e.g., a toggle switch, a rocker switch, and the like). Including such a tactile physical interface improves the operation of the smart switch and smart lighting devices by incorporating the tactile control, simplicity, speed, and convenience of the tactile switch with a universally configurable and efficient smart lighting system. In some embodiments, the smart switch may be activated using another input method, such as voice-activation, remote control, or another suitable input method.

In some embodiments, the smart switch may be configured to mount over or adjacent to an existing conventional wall switch that controls a lighting device in the customer premises. In some embodiments, the smart switch may include a magnetic mount, a stick-on device, or another suitable configuration that enables a smart switch to be mounted over adjacent to the existing conventional wall switch. In some embodiments, the smart switch may be configured to physically maintain the existing conventional wall switch in an "on" position such that a circuit controlled by the existing wall switch is energized. In some embodiments, the smart switch may be configured for wireless communication, for example, using a wireless communication protocol such as Wi-Fi, Zigbee, Z-Wave, or another suitable communication protocol. In some embodiments, the smart switch may be configured to communicate with customer premises equipment, such as a router or another suitable device, which may in some embodiments be provided by the customer service provider.

In various embodiments, a customer service provider server device (a first server device) may be configured to communicate with the smart switch (e.g., via the customer premises equipment). In some embodiments, the customer service provider may provide the customer premises equipment, the server device, and network communication services to the customer premises (e.g., Charter Communications, Inc.) In some embodiments, the customer service provider server device may be configured to perform provisioning operations to register the smart switch. In some embodiments, the customer service provider server device may generate a data record that includes a smart switch identifier of the smart switch. In some embodiments, the customer service provider server device may receive registration message that includes the smart switch identifier. In some embodiments, the customer service provider server device may generate a data record that includes the smart switch identifier.

In some embodiments, the customer service provider server device may request or otherwise obtain a smart lighting device identifier of a smart lighting device in the customer premises. In some embodiments, the customer service provider server device may generate an association between the smart switch identifier and the smart lighting device identifier. In some embodiments, the customer service provider server device may store the generated association in the data record. In various embodiments, the customer service provider server device a provide one or more smart lighting device identifiers to the smart switch. In some embodiments, the smart switch may store the one or more smart lighting device identifiers. In such embodiments, the smart switch may be configured to control two or more smart lighting devices based on the stored smart lighting device identifier(s).

In some embodiments, the smart switch may receive an input at a user interface. The user interface of the smart switch may include a physical switch, such as a toggle switch, a rocker switch, or another suitable physical switch. In some embodiments, the user for interface of the smart switch may include a virtual switch, a touchscreen, a touch sensor, or another suitable switch. In some embodiments, the smart switch may send to the customer service provider server device a smart lighting device instruction. In some embodiments, the smart lighting device instruction may include the smart switch identifier.

In some embodiments, the customer service provider server device may receive the smart lighting device instruction including the smart switch identifier, and may obtain (e.g., from its memory) the associated smart lighting device identifier based on the stored association between the smart switch and the smart lighting device. In some embodiments, the customer service provider server device may send the smart lighting device instruction to a lighting service provider server device (a second server). In some embodiments, the lighting service provider server device may be configured to communicate with the smart lighting device deployed in the customer premises. In some embodiments, the lighting service provider server device may communicate with the smart lighting device via the customer premises equipment. In some embodiments, the lighting service provider server device may send the smart lighting instruction to the smart lighting device.

In some embodiments, the smart lighting device may receive the instruction, and may attempt to execute the smart lighting device instruction. The smart lighting device instruction may include, for example, an instruction to turn on, turn off, dim, brighten, change a color, change a hue, change an illumination pattern, change an illumination rhythm, or another suitable smart lighting device instruction. Based on the attempt to execute the smart lighting device instruction, the smart lighting device may send a status message (a smart lighting device status) to the lighting service provider server device. For example, the smart lighting device status may indicate a success or failure of executing the smart lighting device instruction, a state or status of the smart lighting device, and/or other smart lighting device information.

In some embodiments, the lighting service provider server device may receive the smart lighting device status and may send the smart lighting device status to the customer service provider server device. In some embodiments, the customer service provider server device may receive the smart lighting device status and may send or relay the smart lighting device status to the smart switch. In some embodiments, the smart switch may receive smart lighting device status. In some embodiments, the smart switch may store the smart lighting device status in a memory. In some embodiments, a suitably configured smart switch may generate an indication of the smart lighting status. In some embodiments, the generated indication may include a visual indication, a sound indication, a tactile indication, or combinations thereof.

Various embodiments improve the operation of systems of smart lighting switches and smart lighting devices by increasing the efficiency and applicability of such systems. Various embodiments provide a universal system for managing smart lighting switches and smart lighting devices in which the smart switch and/or smart lighting device of any lighting service provider or manufacturer may be deployed within the system. By generating and managing the associations between one or more smart switches and one or more smart lighting devices at the customer service provider server device, various embodiments enable the deployment of a system for management of smart switches and smart lighting devices that is agnostic to the types of end point devices (i.e., the smart switches and smart lighting devices). Various embodiments improve the operation of smart switches and smart lighting devices by providing a system that incorporates the tactile control, simplicity, speed, and convenience of a wall switch with a universally configurable and efficient smart lighting system.

Various embodiments may be implemented within a variety of communication systems. FIG. 1 illustrates a communication system 100 suitable for use with some embodiments. A customer premises 110 may include one or more smart switch devices 102*a* . . . 102*n*, one or more smart lighting devices 104*a* . . . 104*n*, and customer premises equipment (CPE) 106. The CPE 106 may include a wireless communication device 108, such as a router, a modem, or another suitable device, which may communicate with the CPE 106 via a communication link 140, which may be implemented as a suitable cable or other physical communication link. Each of the smart switch devices 102*a* . . . 102*n* and the smart lighting devices 104*a* . . . 104*n* may communicate with the CPE 106 via the wireless communication device 108 over communication links 130, 132, 134, and 136. In some embodiments, the CPE 106 and/or the wireless communication device 108 may be provided by a customer service provider (e.g., Charter Communications, Inc.). The wireless communication device 108 may also communicate with one or more other devices, such as a mobile computing device 112, over wireless communication link 138. In some embodiments, the smart switch devices 102*a* . . . 102*n* may communicate with each other over a wireless communication link (e.g., a wireless communication link 126). In some embodiments, the smart switch devices 102*a* . . . 102*n* may communicate with the one or more other devices, such as the mobile computing device 112, over a wireless communication link (e.g., a wireless communication link 128).

Each smart lighting device 104 may include a processor, a memory, a radio frequency (RF) unit, and a power unit, which may be coupled through one or more connections (e.g., a bus, data lines, control lines, power lines, or other lines or a combination of connections). Each smart lighting device 104 may be configured to receive and perform a smart lighting device command, such as may be received from a smart switch 102 via the CPE 106. Processes for controlling the smart lighting devices 104 are further described below.

The wireless communication links 130, 132, 134, 136, and 138 may include a plurality of carrier signals, frequencies, or frequency bands, each of which may include a plurality of logical channels. Each of the wireless communication links may utilize one or more radio access technologies (RATs). Examples of RATs that may be used in one or more of the various wireless communication links 130, 132, 134, 136, and 138 include an Institute of Electrical and Electronics Engineers (IEEE) 802.15.4 protocol (such as Thread, ZigBee, and Z-Wave), any of the Institute of Electrical and Electronics Engineers (IEEE) 16.11 standards, or any of the IEEE 802.11 standards, the Bluetooth® standard, Bluetooth Low Energy (BLE), 6LoWPAN, LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless. Further examples of RATs that may be used in one or more of the various wireless communication links within the communication environment 100 include 3GPP Long Term Evolution (LTE), 3G, 4G, 5G, Global System for Mobility (GSM), GSM/General Packet Radio Service (GPRS), Enhanced Data GSM Environment (EDGE), Code Division Multiple Access (CDMA), frequency division multiple access (FDMA), time division multiple access (TDMA), Wideband Code Division Multiple Access (W-CDMA), Worldwide Interoperability for Microwave Access (WiMAX), Time Division Multiple Access (TDMA), and other mobile telephony communication technologies cellular RATs, Terrestrial Trunked Radio (TETRA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, and other mobile telephony communication technologies cellular RATs or other signals that are used to communicate within a wireless, cellular or Internet of Things (IoT) network or further implementations thereof.

The communication system 100 may include a communication network 120 having one or more network elements, including a customer service provider (e.g., Charter Communications, Inc.) server device 122 and a lighting service provider server device 124. In some embodiments, the lighting service provider may provide the smart lighting devices 104*a* . . . 104*n*. The CPE 106 may communicate with the customer service provider server device 122 and a lighting service provider server device 124 via communication links 142 and 146, respectively. The customer service provider server device 122 and the lighting service provider server device 124 may communicate over a communication link 144. Each of the customer service provider server device 122 and the lighting service provider server device 124 may include a processor, volatile memory, nonvolatile memory, network access ports, and a network connection circuit, as well as other components and circuitry, which may be coupled through one or more connections (e.g., a bus, data lines, control lines, power lines, or other lines or a combination of connections).

The communication links 142, 144, and 146 may include wired and/or wireless communication links. Wired communication links may include coaxial cable, optical fiber, and other similar communication links, including combinations thereof (for example, in an HFC network). Wireless communication links may include a plurality of carrier signals, frequencies, or frequency bands, each of which may include a plurality of logical channels. Each of the communication links 142, 144, and 146 may employ a communication protocol to structure and carry information. For example, wired communication links may utilize a protocol such as Data Over Cable Service Interface Specification (DOCSIS). Additionally or alternatively, the communication links 142, 144, and 146 may utilize one or more wireless RATs.

Figure 2:
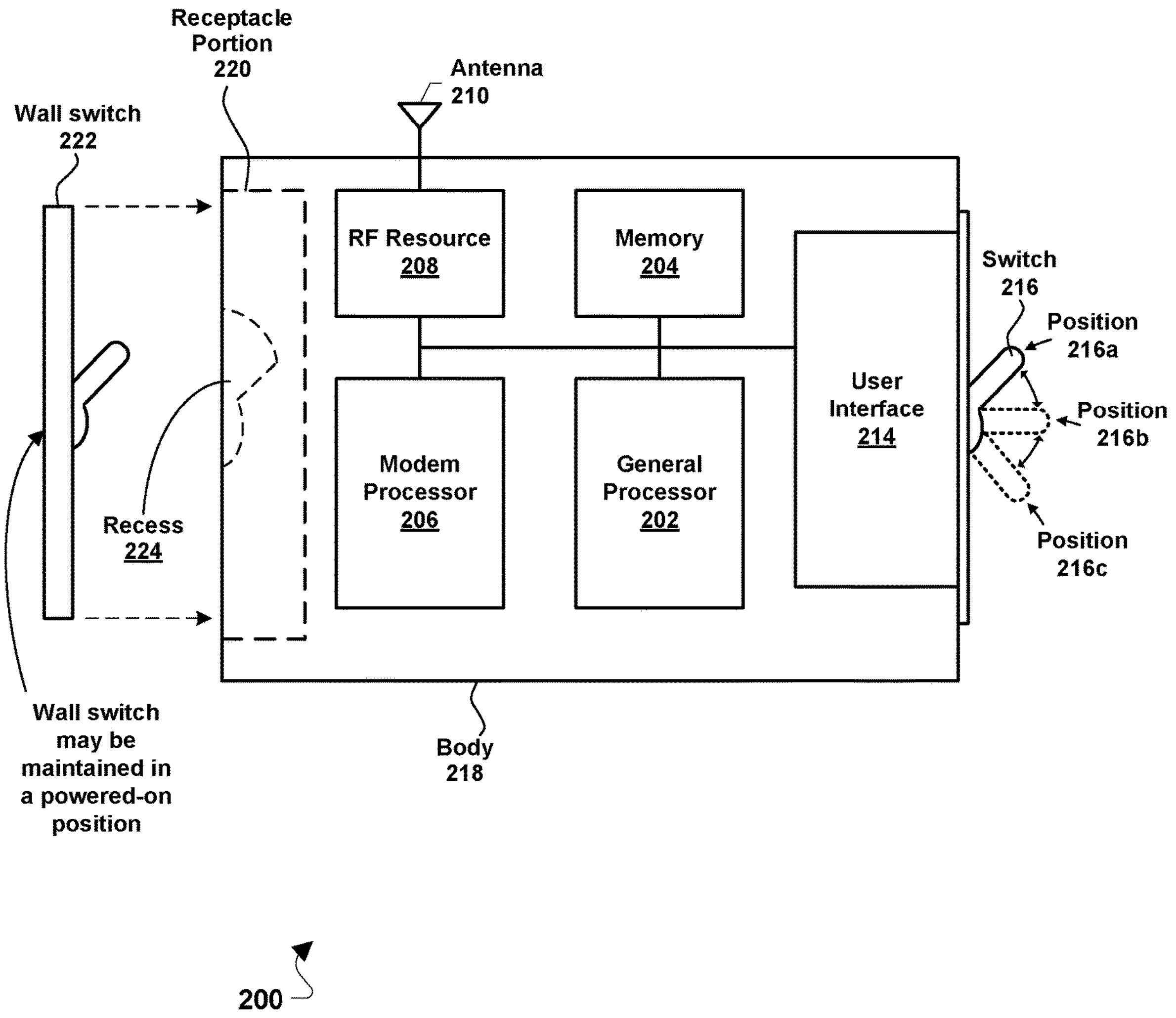
FIG. 2 is a component block diagram illustrating a universal smart switch according to some embodiments.

FIG. 2 is a block diagram illustrating a smart switch 200 according to various embodiments. With reference to FIGS. 1 and 2, in various embodiments, the smart switch 200 may be similar to the smart switch 102*a* . . . 102*n*. The smart switch 200 may include at least one processor, such as a general processor 202, which may be coupled to at least one memory 204. The memory 204 may be a non-transitory computer-readable storage medium that stores processor-executable instructions. The memory 204 may store an operating system, user application software, and/or other executable instructions. The memory 204 may also store application data, such as an array data structure. The memory 204 may include one or more caches, read only memory (ROM), random access memory (RAM), electrically erasable programmable ROM (EEPROM), static RAM (SRAM), dynamic RAM (DRAM), or other types of memory. The general processor 202 may read and write information to and from the memory 204. The memory 204 may also store instructions associated with one or more protocol stacks. A protocol stack generally includes computer executable instructions to enable communication using a radio access protocol or communication protocol (e.g., one or more RATs, as described above).

The processor 202 and the memory 204 may communicate with at least one modem processor 206. The modem processor 206 may perform modem functions for communications with a customer premises device (e.g., the CPE 106), as well as other access points, base stations, Internet of Things devices, and other such devices. The modem processor 206 may use one or more protocol stacks stored in the memory 204. The modem processor 206 may be coupled to an RF resource 208. The RF resource 208 may include various circuitry and components to enable the sending, receiving, and processing of radio signals, such as a modulator/demodulator component, a power amplifier, a gain stage, a digital signal processor (DSP), a signal amplifier, a filter, and other such components. The RF resource 208 may be coupled to a wireless antenna (such as a wireless antenna 210). The smart switch 200 may include additional RF resources and/or antennas without limitation. The RF resource 208 may be configured to provide communications using one or more frequency bands via the antenna 210.

The smart switch 200 may include a user interface 214. The user interface 214 may be configured to receive a user input of various kinds. For example, the user interface 214 may include a physical switch 216, such as a toggle switch, a rocker switch, or another suitable switch. The physical switch 216 may also include a dimmer component, such as a slider, to enable variable adjustment of a brightness of a lighting device. In some embodiments, the user interface 216 may include one or more touch sensors, a touch screen, or another similar component. In some embodiments, the user interface 214 may include various other components, including other input, output, and processing components such as buttons, lights, switches, antennas, various connection ports, additional processors or integrated circuits, and many other components.

In some embodiments, the general processor 202 may be configured to generate one or more commands for smart lighting device in response to a sequence of inputs to the physical switch 216. For example, in response to a single flip or toggle of the physical switch 216, the general processor 202 may generate a first smart lighting device command (e.g., for a first smart lighting device). As another example, in response to two flips or toggles of the physical switch to 16, the general processor 202 may generate a second smart lighting device command (e.g., for a second smart lighting device).

In some embodiments, unlike the typical two-position switch of the wall switch 222, physical switch 216 may be configured to receive an input at multiple positions. In some embodiments, the general processor 202 may be configured to generate one or more commands for a smart lighting device in response to determining that the physical switch 216 is disposed at a particular position. In some embodiments, the general processor 202 may be configured to generate one or more different smart lighting device commands based on a position of the physical switch 216. For example, the general processor 202 may be configured to generate a first smart lighting device command in response to determining that the physical switch is at a first position 216*a*, to generate a second smart lighting device command in response to determining that the physical switch is at a second position 216*b*, to generate a third smart lighting device command in response to determining that the physical switch is at a third position 216*c*, and so forth. In some embodiments, different smart lighting device commands may control different functions of a smart lighting device (e.g., turn on, turn off, dim, brighten, change a color, change a hue, change an illumination pattern, change an illumination rhythm, or another suitable smart lighting device instruction). In some embodiments, different smart lighting device commands may control one or more different smart lighting devices. For example, position 216*c* may dim or turn off multiple lighting groups, position 216*b* may illuminate a first group of smart lighting devices, and position 216*c* may illuminate a first and a second group of smart lighting devices. Other examples are also possible.

The smart switch 200 may also include a bus that communicatively connects the various components of the smart switch 200 together, as well as hardware and/or software interfaces to enable communication among the various components.

The components of smart switch 200 may be housed in a body 218, which may be formed of plastic, metallic, or other similar materials. In some embodiments, the body 218 may include a receptacle portion 220 configured to accommodate a wall switch 222. In some embodiments, the smart switch 200 may be disposed to substantially cover the wall switch 222. For example, the body 218 may be configured such that the smart switch 220 may be placed over or on an existing wall switch 222 such that the wall switch 222 substantially fits within the receptacle portion 220. In some embodiments, the receptacle portion 220 may include a recess 224 to receive the wall switch 222. In some embodiments, the smart switch 200 may be fastened over the wall switch 222 by a fastener, such as an adhesive, screw, bolt, clamp, magnetic, or another suitable fastener. In some embodiments, the receptacle portion 220 may prevent manual access to the wall switch 222 when the smart switch 200 is positioned over the wall switch 222. In some embodiments, the receptacle portion 220 and/or the recess 224 may be formed to maintain a position of the wall switch in an energized or powered-on position when smart switch 200 is positioned over or on the wall switch 222. For example, the wall switch 222 may include a toggle switch, and the receptacle portion 220 and/or the recess 224 may be formed such that when the smart switch 200 is positioned over the wall switch 222, the wall switch 222 is maintained in a position in which the circuit associated with the wall switch 222 is energized.

Figure 3:
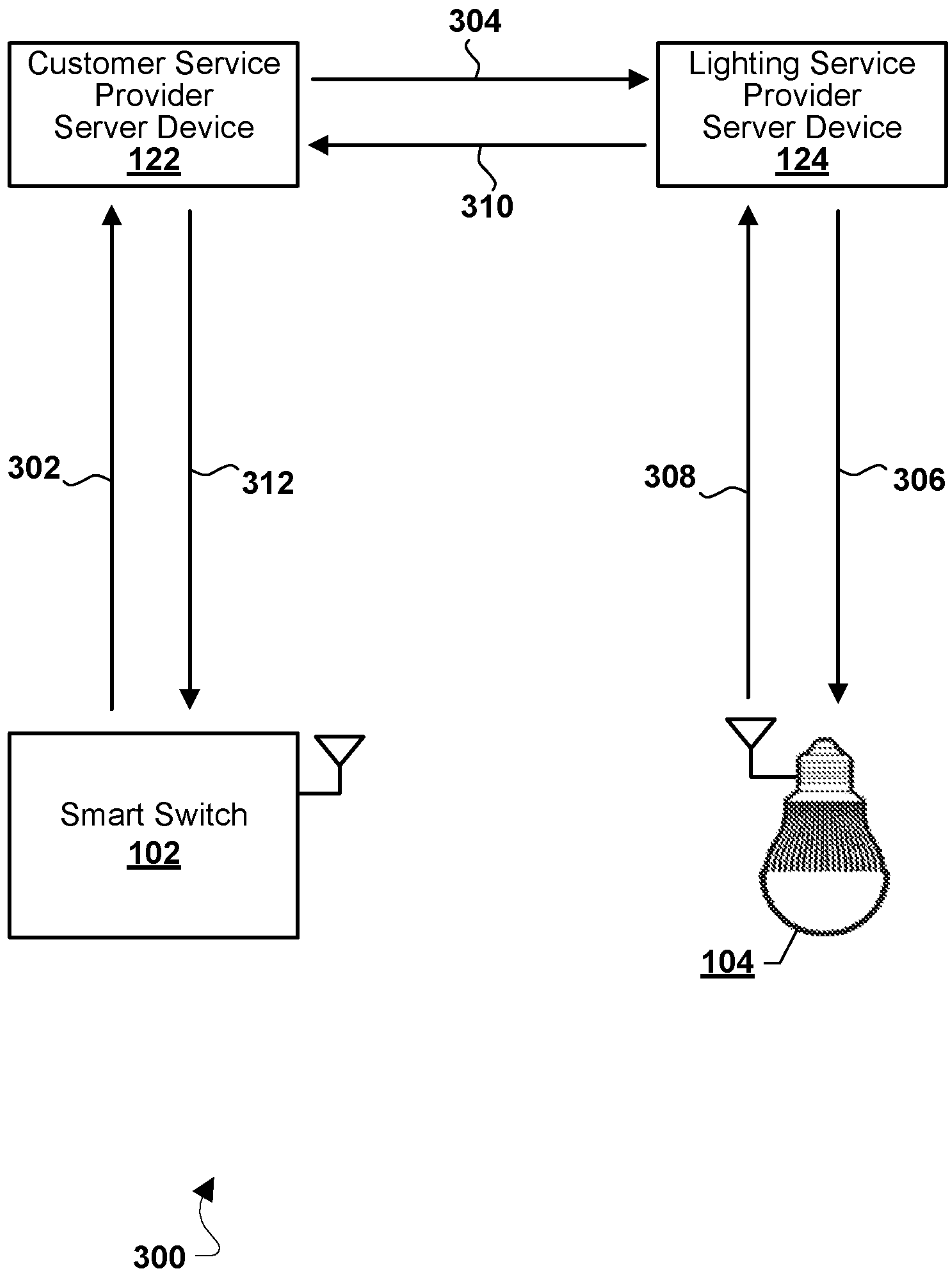
FIG. 3 is a process flow diagram illustrating a method for controlling a smart lighting device according to some embodiments.

FIG. 3 is a process flow diagram illustrating a method 300 for controlling a smart lighting device according to some embodiments. With reference to FIGS. 1-3, the method 300 may be implemented by a processor (e.g., the general processor 202) of a smart switch (e.g., the smart switches 102, 200) and/or of a server device (e.g., a processor of the customer service provider server device 122, the lighting service provider device 124, and a smart lighting device (e.g., the smart lighting device 104).

The processor of the smart switch 102 may receive an input (e.g., at the user interface 214) that may correspond to a smart lighting device instruction. In various embodiments, the smart lighting device instruction may include an instruction to turn on, turn off, dim, brighten, change a color, change a hue, change an illumination pattern, change an illumination rhythm, or another suitable smart lighting device instruction. The processor of the smart switch 102 may send message 302 including the smart lighting device instruction to the customer service provider server device 122. In some embodiments, the smart lighting device instruction may include a unique identifier of the smart switch 102.

The processor of the customer service provider server device 122 may receive the smart lighting device instruction and may obtain the smart switch identifier. In some embodiments, the processor of the customer service provider server device 122 may identify that the smart lighting device 104 is associated with the smart switch 102 based on an association stored in a data record of the customer service provider server device 122. In some embodiments, the processor of the customer service provider server device 122 may send a message 304 including the smart lighting device instruction to the lighting service provider server device 124 based on the identified smart lighting device 104.

The customer service provider server device 122 and the lighting service provider server device 124 may communicate using a secure access protocol that enables limited authorization to access devices such as the smart switch 102 and the smart lighting device 104. Examples of a secure access protocol include OAuth, OAuth2, JOSE (Javascript Object Signing and Encryption), and JWT (JavaScript Object Notation (JSON) Web Token). In some embodiments, the secure access protocol may enable the customer service provider server device 122 and the lighting service provider server device 124 to exchange permission data (e.g., "tokens"), which each server device may use to access a resource hosted by the other server device server. Examples of a hosted resource may include a service that communicates with the smart switch 102 and/or the smart lighting device 104. In some embodiments, a server device may provide access to a hosted resource via an application programming interface (API) or another suitable access interface. In some embodiments, the message 304 may include a secure access protocol message, such as an OAuth message. For example, the lighting service provider server device 124 may provide a hosted service that provides communication with the smart lighting device 104, including the capability of sending instructions to and/or receiving information from the smart lighting device 104.

The processor of the lighting service provider server device 124 may receive the message 304 including the smart lighting device instruction. In some embodiments, based on the message 304, the lighting service provide server device may identify the smart lighting device 104, e.g., as the intended recipient of the smart lighting device instruction. The processor of the lighting service provider server device 124 may send a message 306 including the smart lighting instruction to the smart lighting device 104.

The processor of the smart lighting device 104 may attempt to perform the smart lighting instruction in the message 306. The processor of the smart lighting device 104 may send to the lighting service provider server device 124 a message 308 based on the attempt to perform the smart lighting instruction. In some embodiments, the message 308 may include an indication of a success or failure of executing the smart lighting device instruction. In some embodiments, the message 308 may include a state or status of the smart lighting device 104. In some embodiments, the message 308 may include other smart lighting device information.

The processor of the lighting service provider server device 124 may receive the message 308, and may send to the customer service provider server device 122 a message 310. In some embodiments, the message 310 may include a status of the smart lighting device 104. In some embodiments, the message 310 may include other information based on the message 308. In some embodiments, the message 310 may include a message structured according to the secure access protocol, such as an OAuth status message.

The processor of the customer service provider server device 122 may receive the message 310, and may send a message 312 to the smart switch 102. The message 312 may include a status of the smart lighting device 104, an indication of the success or failure of executing the smart lighting device instruction, and/or other information about the smart lighting device 104. In some embodiments, the smart switch 102 may store the smart lighting device status in a memory. In some embodiments, the smart switch 102 may generate an indication of the smart lighting device status, such as a visual indication, a sound indication, a tactile indication, or combinations thereof.

Figure 4:
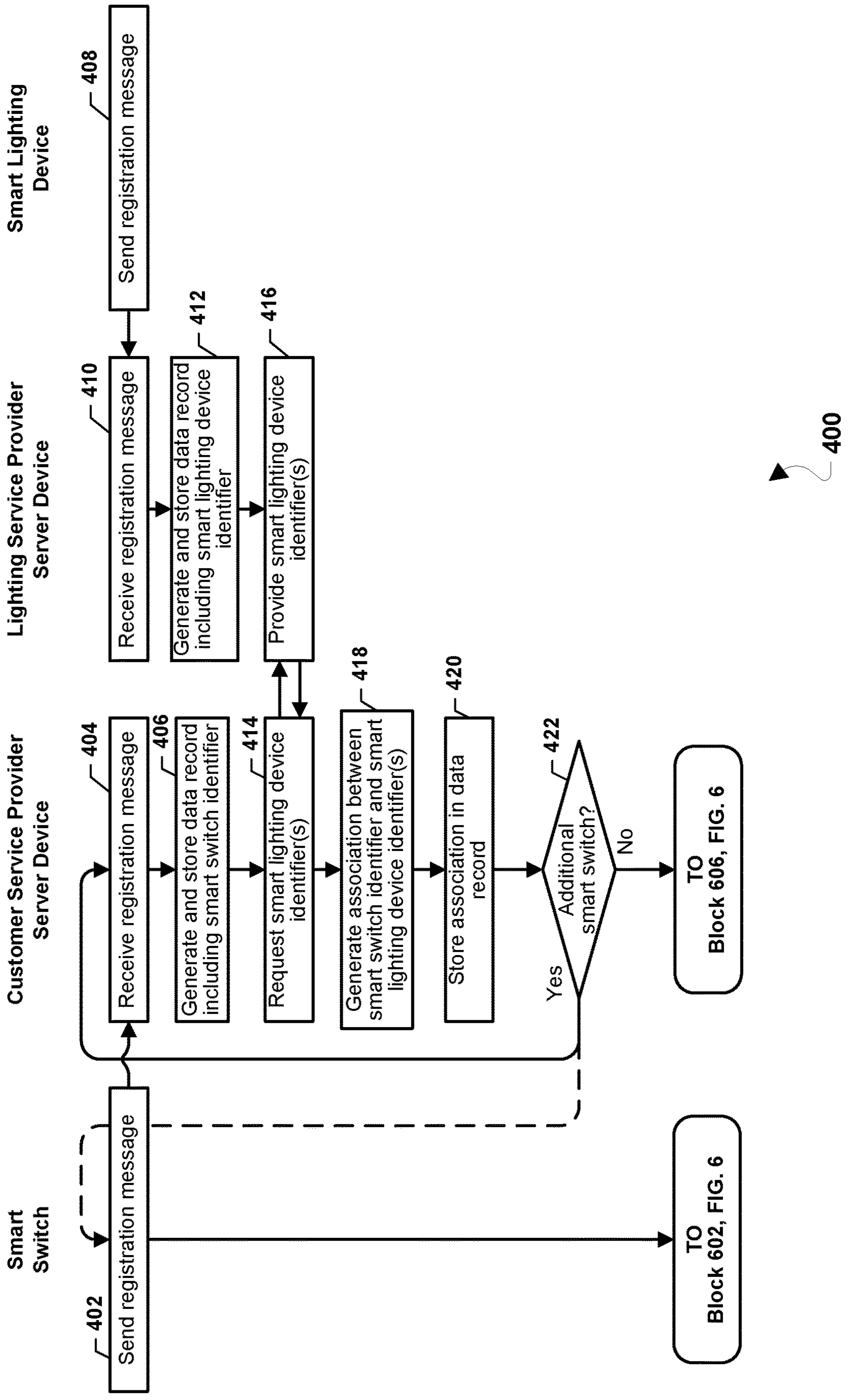
FIG. 4 is a process flow diagram illustrating a method for controlling a smart lighting device according to some embodiments.

FIG. 4 is a process flow diagram illustrating a method 400 for controlling a smart lighting device according to some embodiments. With reference to FIGS. 1-4, the method 400 may be implemented by a processor (e.g., the general processor 202) of a smart switch (e.g., the smart switches 102, 200), a processor of a server device of a server device (e.g., a processor of the customer service provider server device 122, the lighting service provider device 124), and a processor of a smart lighting device (e.g., the smart lighting device 104). In various embodiments, the method 400 may enable the customer service provider server device to provision the smart switch such that smart lighting device instructions from the smart switch may control a smart lighting device.

In block 402, the processor of the smart switch may send a registration message to the customer service provider server device. In some embodiments, the registration message may include a smart switch identifier that uniquely identifies the smart switch. Additionally or alternatively, in some embodiments, the processor of the customer service provider server device may generate the smart switch identifier in response to receiving the registration message from the smart switch. In some embodiments, the processor of the smart switch may send the registration message in response to receiving an input at a physical switch (e.g., the switch 216). For example, the processor of the smart switch may send the registration message in response to receiving a sequence of switch throws, toggles, or other similar inputs.

In some embodiments, the registration message may include an indication of one or more smart lighting devices with which the smart switch is to be associated. For example, the smart switch 102*a* may send a registration message that includes an indication of the smart lighting device 104*a*. In some embodiments, the smart switch 102*a* may, using its wireless communication capability, detect the smart lighting device 104*a* (e.g., based on a signal emitted from the smart lighting device 104*a*). In such embodiments, the smart switch may send a message that includes an indication of the detected smart lighting device. In some embodiments, the smart switch may detect two or more smart lighting devices. In some embodiments, the smart switch may be provided with indicators of two or more smart lighting device (e.g., through the user interface 214). In some embodiments, the smart switch may send a message (which may be the registration message) that includes indicators of one, some, or all of the detected smart lighting devices. In some embodiments, the smart switch may determine the closest of the detected smart lighting devices (for example, based on a comparison of a received signal strength of a signal from each of the detected smart lighting devices). In such embodiments, the smart switch may send a message that includes an indicator of the closest detected smart lighting device. The indication of the smart lighting device(s) may be used to associate the smart switch identifier and a unique identifier of one or more smart lighting devices, as further described below.

In some embodiments, the registration message may include an indication of a location of the smart switch (e.g., a location within the customer premises 110). The indication of the location of the smart switch may be used to associate the smart switch identifier and a unique identifier of one or more smart lighting devices, as further described below.

In block 404, the processor of the customer service provider server device may receive the registration message.

In block 406, the processor of the customer service provider server device may generate a data record including the smart switch identifier. In some embodiments the processor of the customer service provider server device may store the generated data record in a memory. As further described below, the processor of the customer service provider server device may use the data record to correlate smart switch identifier(s) and smart lighting device identifier(s). In some embodiments, the processor of the customer service provider server device may store in the data record an operational status, current state, or current activity of the smart lighting device(s).

In block 408, the processor of the smart lighting device 104 may send a registration message to the lighting service provider server device.

In block 410, the processor of the lighting service provider server device may receive the registration message.

The registration message may include an identifier of the smart lighting device 104 (e.g., a smart lighting device identifier). In some embodiments, the processor of the lighting service provider server device 124 may generate the smart lighting device identifier in response to receiving the registration message. In some embodiments, the lighting service provider 124 may provide a hosted service that provides, among other things, the capability of sending instructions to and/or receiving information from the smart lighting device 104. The lighting service provider server device 124 may register an identifier of the smart lighting device to enable the provisioning of the hosted service.

In block 412, the processor of the lighting service provider server device 124 may generate and store a data record that includes the smart lighting device identifier. In various embodiments, the processor of the lighting service provider server device 124 may receive registration messages from a plurality of smart lighting devices 104, and may perform the operations of blocks 410 and 412 for the plurality of registration messages and/or the plurality of smart lighting devices 104*n*.

In block 414, the processor of the customer service provider server device 122 may send a request message to the lighting service provider server device 124 requesting one or more smart lighting device identifiers. In some embodiments, the request message may include the indication of one or more smart lighting devices 104*n*. In some embodiments, the customer premises may include a location in which two or more smart lighting devices 104*n* may be controlled by a single light switch 102. In such embodiments, the processor of the customer service provider server device 124 may send a request message requesting the identifiers of two or more smart lighting devices 104*n* that are controlled by the single switch 102.

In block 416, the processor of the lighting service provider server device 124 may send a response message to the customer service provider server device 122 to provide the one or more smart lighting device identifiers. In some embodiments, the response message may include identifiers of one or more smart lighting devices 104*n* in response to the request message that included the indication of the one or more smart lighting devices.

In some embodiments, the request message (e.g., block 414) may include an indication of the location of the smart switch 102 (e.g., a location within the customer premises 110). In such embodiments, the response message (e.g., block 416) may include identifiers of one or more smart lighting devices 104*n* in response to the indicated location of the smart switch 102.

In block 418, the processor of the customer service provider server device 122 may generate an association between the smart switch identifier and the one or more smart lighting device identifiers.

In block 420, the processor of the customer service provider server device 122 may store the association in the data record. In some embodiments, the processor of the customer service provider server device may store status information of the one or more smart lighting devices in the data record.

In determination block 422, the processor of the customer service provider server device 122 may determine whether there is an additional smart switch 102*n* (e.g., to register).

In response to determining that there is an additional smart switch 102*n* to register (i.e., determination block 422="Yes"), the processor of the customer service provider server device 122 may perform the operations of block 404, and may receive a registration message sent by the additional smart switch 102*n*.

In some embodiments, the additional smart switch 102*n* may send a registration message that includes an indication of a smart lighting device 104 that is the same smart lighting device as the previous smart switch. For example, two (or more) smart switches 102 may be configured to control the same smart lighting device 104, analogous to a wired system in which two or more wall switches control one light.

Figure 6:
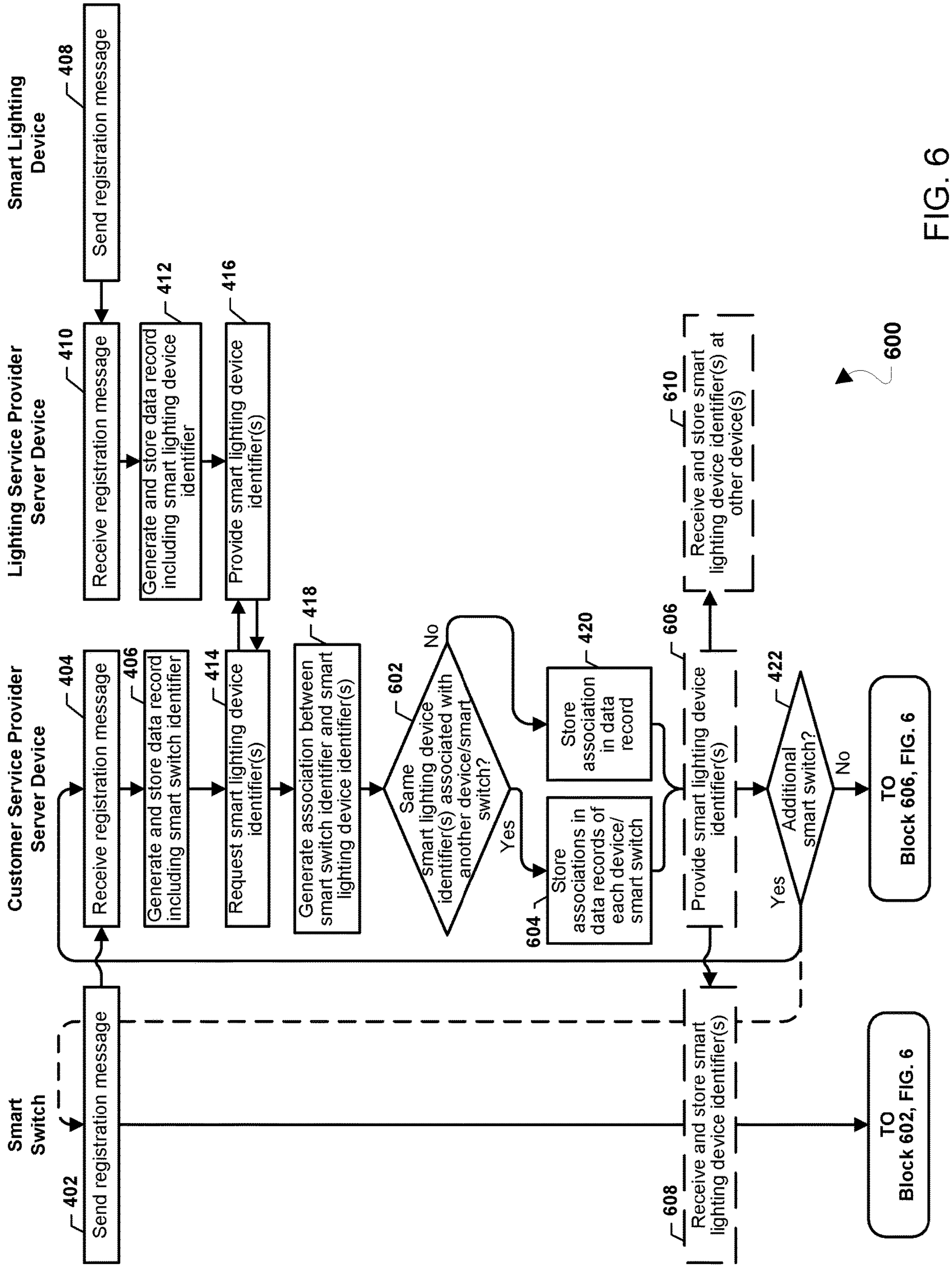
FIG. 6 is a process flow diagram illustrating a method for controlling a smart lighting device according to some embodiments.

In response to determining that there is no additional smart switch to register (i.e., determination block 422="No"), the processor of the customer service provider server device may proceed to block 606 in FIG. 6.

After sending a registration message in block 402, the processor of the smart switch (or of each smart switch) may proceed to block 602 in FIG. 6.

Figure 5:
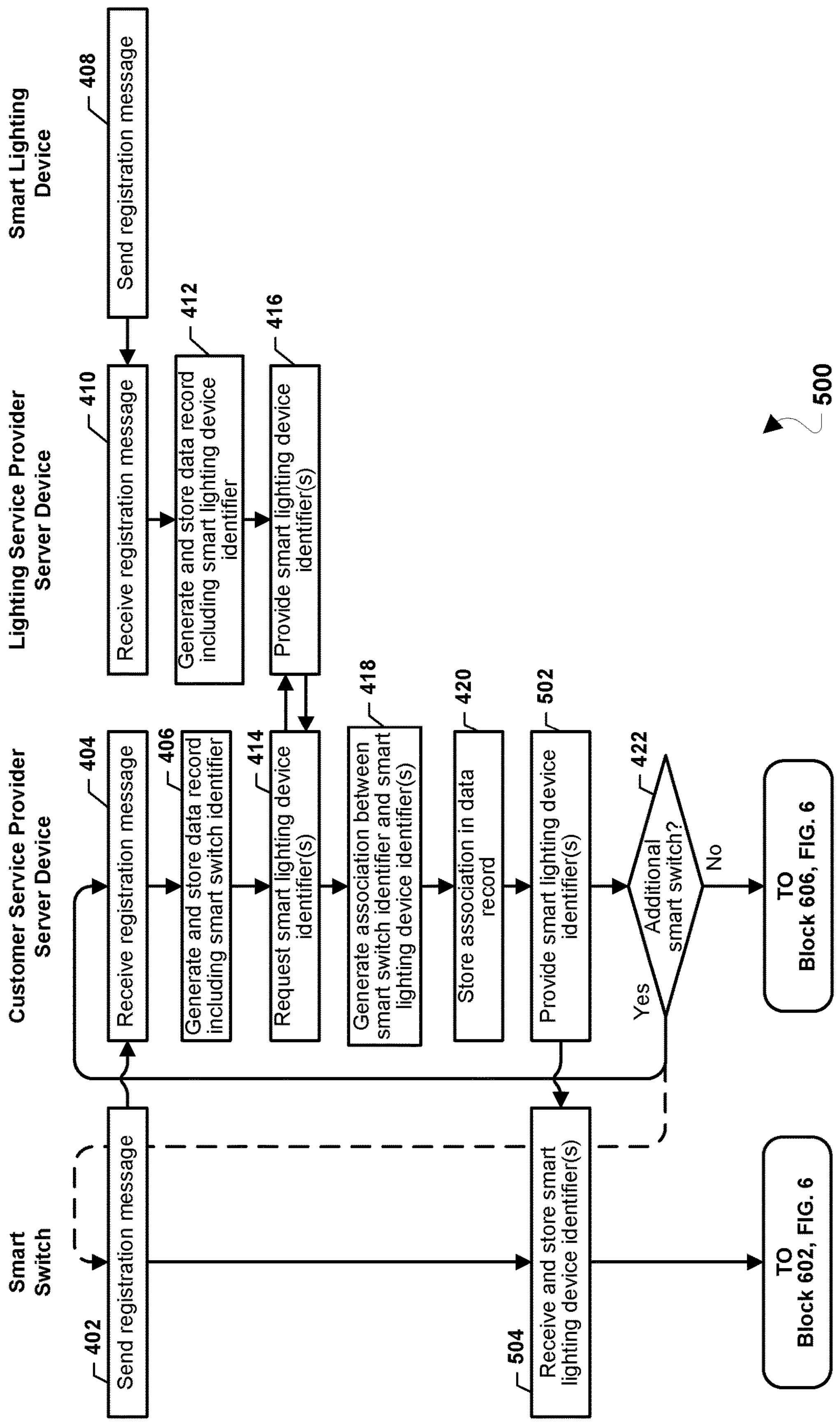
FIG. 5 is a process flow diagram illustrating a method for controlling a smart lighting device according to some embodiments.

FIG. 5 is a process flow diagram illustrating a method 500 for controlling a smart lighting device 104 according to some embodiments. With reference to FIGS. 1-5, the method 500 may be implemented by a processor (e.g., the general processor 202) of a smart switch (e.g., the smart switches 102, 200), a processor of a server device of a server device (e.g., a processor of the customer service provider server device 122, the lighting service provider device 124), and a processor of a smart lighting device (e.g., the smart lighting device 104). In blocks 402, 404, 406, 414, 418, 420, and 422, the processors of the smart switch and the customer service provider server device may perform operations of like-numbered blocks of the method 400 as described.

In block 502, the processor of the customer service provider server device 122 may provide the one or more smart lighting device identifiers to the smart switch 102.

In block 504, the processor of the smart switch 102 may receive and store in a memory the one or more smart lighting device identifiers. In some embodiments, the processor of the smart switch may generate a data record and may store the smart lighting devices identifier(s) in the data record (e.g., in a memory of the smart switch). In some embodiments, such as where multiple smart switches are being configured to control one or more smart lighting devices, the processor of the smart switch may receive and store one or more smart switch identifiers from other smart switches. In some embodiments, the processor the smart switch may receive and store one or more associations between a plurality of smart switches and one or more smart lighting devices.

FIG. 6 is a process flow diagram illustrating a method 600 for controlling a smart lighting device 104 according to some embodiments. With reference to FIGS. 1-6, the method 600 may be implemented by a processor (e.g., the general processor 202) of a smart switch (e.g., the smart switches 102, 200), a processor of a server device of a server device (e.g., a processor of the customer service provider server device 122, the lighting service provider device 124), and a processor of a smart lighting device (e.g., the smart lighting device 104). In blocks 402, 404, 406, 414, 418, 420, 422, 502, and 504, the processors of the smart switch, the customer service provider server device, the lighting service provider server device, and the smart lighting device may perform operations of like-numbered blocks of the methods 400 and 500 as described.

In some embodiments, the customer service provider server device, two or more smart switches, and/or another device (e.g., the mobile computing device 112, a smart home control unit such as a "smart speaker" device, or another suitable device) may be configured to operate one or more smart lighting devices from multiple control points, analogous to a 3-way switch control circuit. In some embodiments, multiple control points (e.g., N-way) may be configured to control the same one or more smart lighting devices (or the same one or more groups of smart lighting devices). In some embodiments, multiple control points may be configured to control two or more groups of smart lighting devices. "N-way control operations" may refer to the configuration of the customer service provider server device and/or two or more smart switches to control one or more smart lighting devices or one or more groups of smart lighting devices.

In determination block 602, the processor of the customer service provider server device 122 may determine whether the same smart lighting device identifier of one or more smart lighting devices is associated with another smart switch. For example, the processor of the customer service provider server device 122 may determine that a first smart switch and a second smart switch are associated with the same one or more smart lighting devices. In some embodiments, the processor of the customer service provider server device 122 may determine whether the same smart lighting device identifier of one or more smart lighting devices is associated with a smart switch and with another device, such as a mobile computing device or a "smart speaker" device.

In response to determining that the same smart lighting device identifier of one or more smart lighting devices is associated with another device or smart switch (i.e., determination block 602="Yes"), the processor of the customer service provider server device 122 may store the associations of all of the devices and the smart lighting device identifier(s) in the data record of each device and/or smart switch in block 604.

In some embodiments, the processor of the customer service provider server device may store the associations of all of the devices and the smart lighting device identifier(s) in the data record of each device and/or smart switch in a single data record. In some embodiments, the processor of the customer service provider server device may store status information of the one or more smart lighting devices in the data record. In some embodiments, the processor of the customer service provider server device may generate multiple data records (e.g., a data record for each smart switch or other device)

In response to determining that the same smart lighting device identifier of one or more smart lighting devices is not associated with another device or smart switch (i.e., determination block 602="No"), the processor of the customer service provider server device 122 may perform the operations of block 420 as described.

In optional block 606, the processor of the customer service provider server device 122 may provide the one or more smart lighting device identifiers to the smart switch 102. In embodiments in which the same smart lighting device identifier of one or more smart lighting devices is associated with another device or smart switch, the processor of the customer service provider server device 122 may provide the one or more smart lighting device identifiers to the other device(s).

In optional block 608, the processor of each smart switch may optionally receive and store in a memory the one or more smart lighting device identifiers. In some embodiments, such as where multiple smart switches are being configured to control one or more smart lighting devices, the processor of the smart switch may receive and store one or more smart switch identifiers from other smart switches. In some embodiments, the processor the smart switch may receive and store one or more associations between a plurality of smart switches and one or more smart lighting devices. In some embodiments, the processor of the smart switch may be configured to operate in a 3-way or N-way control configuration in which two or more smart switches may be configured to control one or more smart lighting devices.

In optional block 610, a processor of each of the other devices (e.g., a mobile computing device or a "smart speaker" device) may receive and store the one or more smart lighting device identifiers.

Figure 7:
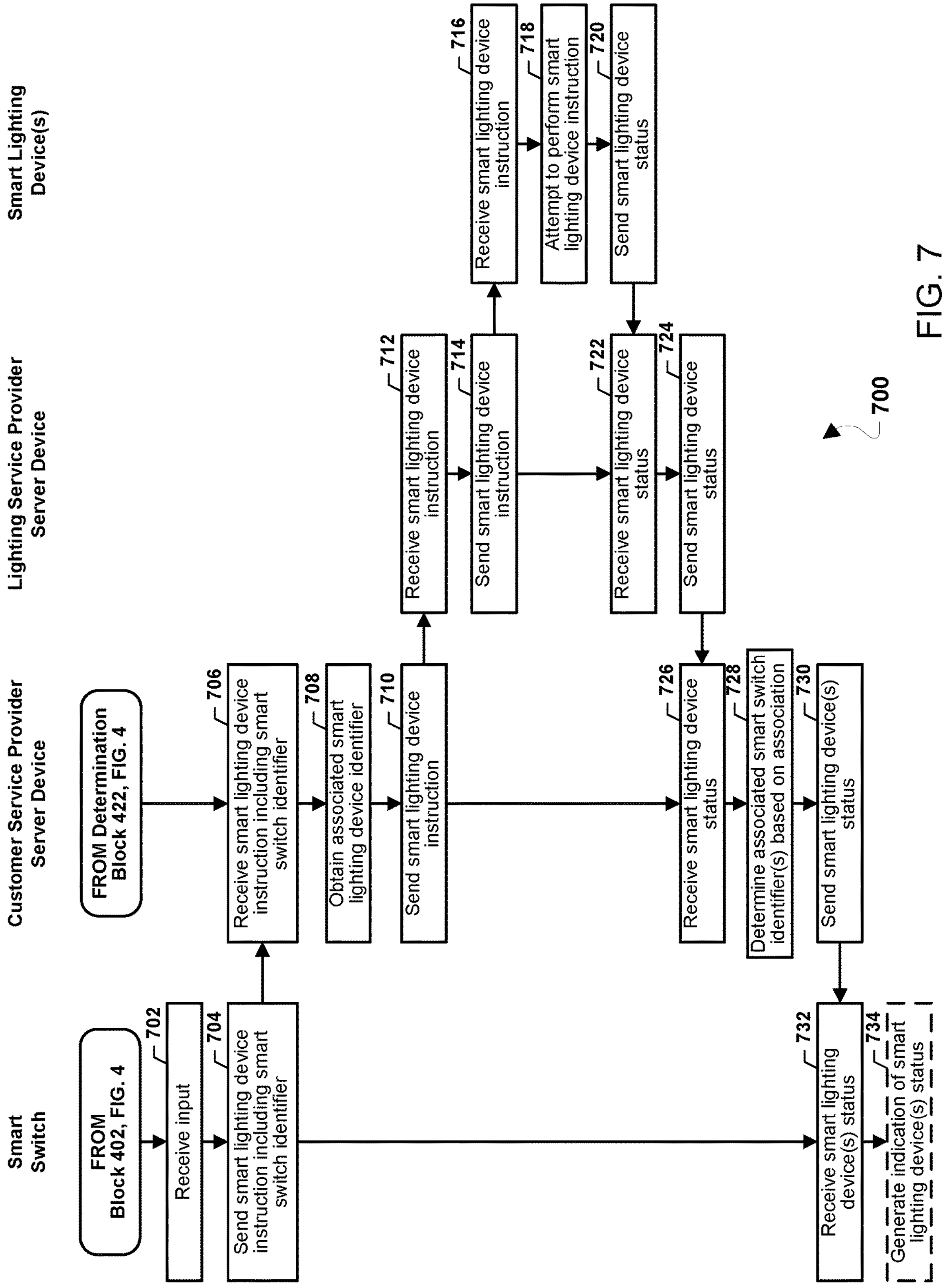
FIG. 7 is a process flow diagram illustrating a method for controlling a smart lighting device according to some embodiments.

FIG. 7 is a process flow diagram illustrating a method 700 for controlling a smart lighting device 104 according to some embodiments. With reference to FIGS. 1-7, the method 700 may be implemented by a processor (e.g., the general processor 202) of a smart switch (e.g., the smart switches 102, 200), a processor of a server device of a server device (e.g., a processor of the customer service provider server device 122, the lighting service provider device 124), and a processor of a smart lighting device (e.g., the smart lighting device 104). In various embodiments, the method 700 may enable the customer service provider server device to correlate an instruction from a provisioned smart switch to one or more smart lighting devices based on the association generated by the customer service provider server device.

The processor of the smart switch 202 may receive an input (e.g., at the user interface 214) that may correspond to a smart lighting device instruction. In some embodiments, the smart switch 102 may receive the input 214 at a physical switch (e.g., the switch 216) of the smart switch.

In block 704, in response to the received input the processor of the smart switch 202 may send a smart lighting device instruction to the customer service provider server device 122. In some embodiments, in response to the received input the processor of the smart switch 202 may generate the smart lighting instruction and send the generated smart lighting device instruction to the customer service provider server device 122. In some embodiments, the smart lighting device instruction may include the smart switch identifier. In some embodiments, the smart lighting device instruction may include one or more smart lighting device identifiers. In some embodiments, the smart lighting device instruction may include a specific instruction for the smart lighting device. For example, the smart lighting device instruction may include an instruction to turn on, turn off, dim, brighten, change a color, change a hue, change an illumination pattern, change an illumination rhythm, or another suitable smart lighting device instruction.

In b lock 706, the processor of the customer service provider server device may receive the smart lighting device instruction. In some embodiments, the processor of the customer service provider server device 122 may obtain the smart switch identifier from the smart lighting device instruction.

In block 708, the processor of the customer service provider server device 122 may obtain the smart lighting device identifier associated with the smart switch. In some embodiments, processor of the customer service provider server device may obtain the smart lighting device identifier based on the association stored in the data record in the customer service provider server device. In some embodiments, processor of the customer service provider server device may obtain an operational state, status, or current activity from the data record.

In block 710, the processor of the customer service provider server device 122 may send (or may generate and send) the smart lighting device instruction to the lighting service provider server device. In some embodiments the smart lighting device instruction may include one or more smart lighting device identifiers, to indicate the target smart lighting device(s) for the smart lighting device instruction.

In block 712, the processor of the lighting service provider server device may receive the smart lighting device instruction.

In block 714, the processor of the lighting service provider server device may send the smart lighting instruction to the smart lighting device. In some embodiments, the processor of the lighting service provider server device may send the smart lighting instruction to one or more smart lighting devices.

In block 716, the processor of the smart lighting device (or each processor of two or more smart lighting devices) may receive the smart lighting instruction.

In block 718, the processor(s) of the smart lighting device(s) may attempt to perform the smart lighting instruction.

In block 720, the processor(s) of the smart lighting device(s) may send to the lighting service provider server device a smart lighting device status message based on the attempt to perform the smart lighting instruction. In some embodiments, the status message may include an indication of a success or failure of performing the smart lighting device instruction by a smart lighting device. In some embodiments, the status message may include an operating state or status of the smart lighting device. In some embodiments, the status message may include other smart lighting device information.

In block 722, the processor of the lighting service provider server device may receive the status message.

In block 724, the processor of the lighting service provider server device may send to the customer service provider server device a smart lighting device status message. In some embodiments, the smart lighting device status message sent by the lighting service provider server device may include information related to one or more smart lighting devices. In some embodiments, the lighting service provider server device may send a separate status message for each smart lighting device.

In block 726, the processor of the customer service provider server device may receive the status message(s) from the lighting service provider server device.

In block 728, the processor of the customer service provider server device may determine the smart switch identifier associated with the smart lighting device based on the status message(s). In some embodiments, two or more smart switches may control a single smart lighting device or the same group of smart lighting devices. In such embodiments, the processor of the customer service provider service device may determine the two or more smart switch identifiers associated with the smart lighting device based on the association stored in the data record in the customer service provider server device.

In block 730, the processor of the customer service provider server device may send one or more smart lighting device status messages to the smart switch. The status message(s) may include a status of the one or more smart lighting devices, an indication of the success or failure of executing the smart lighting device instruction by the one or more smart lighting devices, and/or other information about the smart lighting device(s). In embodiments in which two or more smart switches are associated with the smart lighting device(s), the processor of the customer service provider server device may send the smart lighting device status to the two or more smart switches.

In block 732, the processor of the smart switch(es) may receive the smart lighting device status message(s).

In optional block 734, the processor of the smart switch(es) may generate an indication of the smart lighting devices status. In some embodiments, the processor of each smart switch may generate an indication of the smart lighting device status (or status of multiple smart lighting devices), such as a visual indication, a sound indication, a tactile indication, or combinations thereof. In some embodiments, the processor of each smart switch may store the smart lighting device status in a memory.

Figure 8:
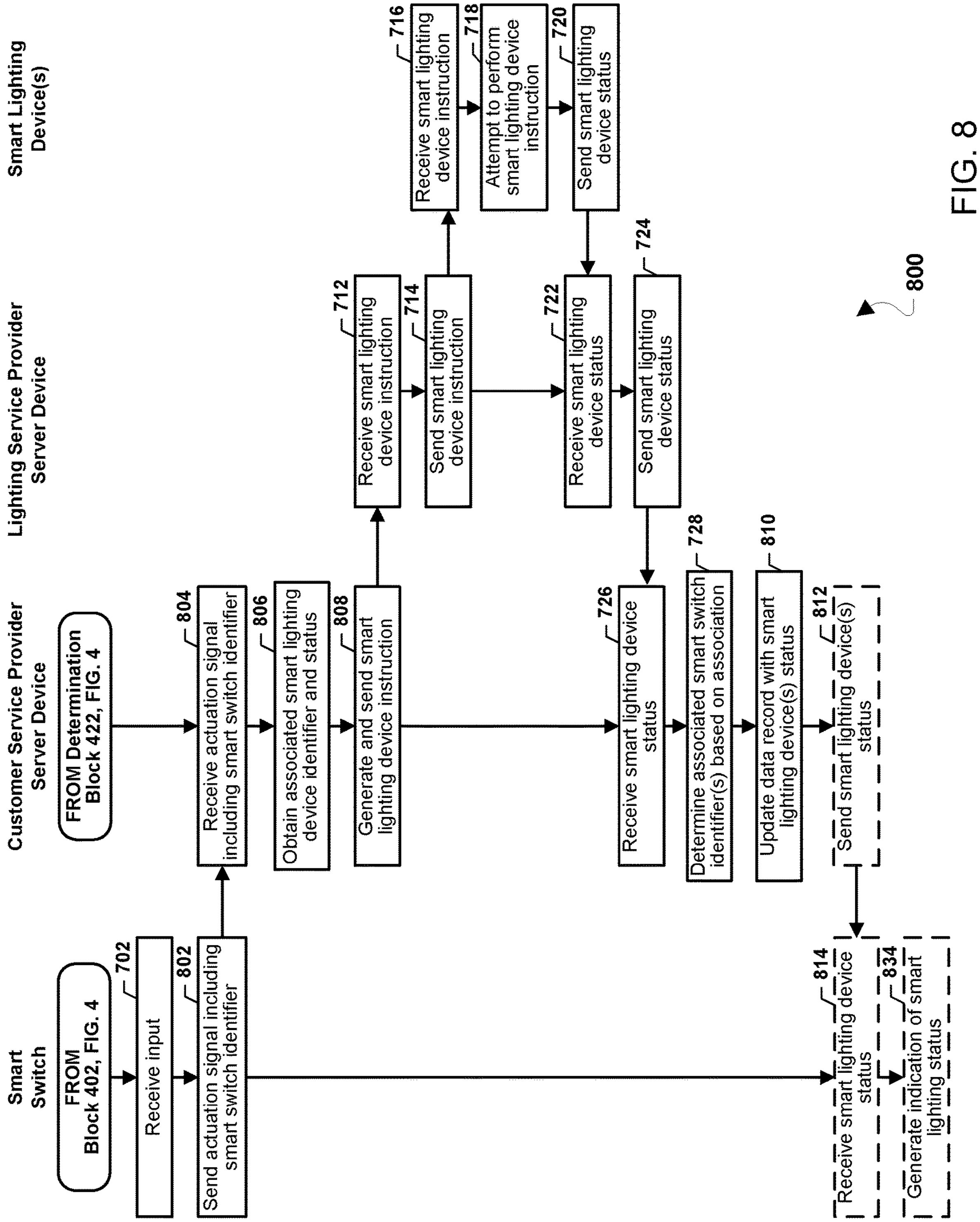
FIG. 8 is a process flow diagram illustrating a method for controlling a smart lighting device according to some embodiments.

FIG. 8 is a process flow diagram illustrating a method 800 for controlling a smart lighting device 104 according to some embodiments. With reference to FIGS. 1-8, the method 800 may be implemented by a processor (e.g., the general processor 202) of a smart switch (e.g., the smart switches 102, 200), a processor of a server device of a server device (e.g., a processor of the customer service provider server device 122, the lighting service provider device 124), and a processor of a smart lighting device (e.g., the smart lighting device 104). In blocks 702 and 712-734, the processors of the smart switch, the customer service provider server device, the lighting service provider server device, and the smart lighting device may perform operations of like-numbered blocks of the method 700 as described.

In various embodiments, the method 800 may enable the customer service provider server device to receive a relatively simple actuation signal from a provisioned smart switch, correlate the received actuation signal to one or more smart lighting devices based on the association generated by the customer service provider server device, and to generate a smart lighting instruction for the smart lighting device(s) based on a current operational state of the smart lighting device(s). In some embodiments, two or more smart switches may be configured to send an actuation signal to the same smart lighting device(s).

In block 802, the processor of the smart switch may send an actuation signal to the customer service provider server device, e.g., in response to receiving an input (block 702). In some embodiments, the processor of the smart switch may send the actuation signal in response to a received input (e.g., block 702) at a physical switch (e.g., the switch 216) of the smart switch In some embodiments, the actuation signal may include a simple instruction to change the state of a smart lighting device, as further described below. In some embodiments, in response to the received input the processor of the smart switch may generate the actuation signal and send the generated actuation signal to the customer service provider server device (e.g., 122). In some embodiments, the actuation signal may include the smart switch identifier. In some embodiments, the actuation signal may include one or more smart lighting device identifiers. In some embodiments, the actuation signal may, in some embodiments, be an instruction to change an operating state of the smart lighting device, as further described below.

In b lock 804, the processor of the customer service provider server device may receive the smart lighting device instruction. In some embodiments, the processor of the customer service provider server device may obtain the smart switch identifier from the actuation signal.

In block 806, the processor of the customer service provider server device may obtain the smart lighting device identifier associated with the smart switch and the current state of the smart lighting devices (or devices) associated with the smart lighting device identifier (or identifiers). The status of the smart lighting device(s) may reflect a current operation or activity of the smart lighting devices, such as illuminating at a steady brightness, increasing in brightness, decreasing in brightness, pulsing, flashing, on standby/not currently illuminating, and the like. In some embodiments, processor of the customer service provider server device may obtain the smart lighting device identifier based on the association stored in the data record in the customer service provider server device.

In block 808, the processor of the customer service provider server device may generate a smart lighting device instruction and send the generated instruction to the lighting service provider server device (e.g., 124). In some embodiments, the processor of the customer service provider server device may generate the smart lighting device instruction based on the state of the smart lighting device(s). For example, if the smart lighting device state is off, the actuation signal may instruct or cause the smart lighting device to turn on. As another example, if the smart lighting device state is on, the actuation signal may instruct or cause the smart lighting device to turn off. As another example, if the smart lighting device state indicates that the smart lighting device is performing an activity (e.g., increasing brightness, decreasing brightness (e.g., dimming), flashing, pulsing, changing color, and the like), the actuation signal may, for example, cause the smart lighting device to perform a different activity. For example, a smart lighting device may be configured to perform a variety of operations. In some embodiments, in response to receiving the actuation signal, the smart lighting device may select and perform one of those operations. In some embodiments, in response to receiving the actuation signal, the smart lighting device may cycle through each of the operations in turn. For example, a first actuation signal may cause the smart lighting device to turn on, a second actuation signal may cause the smart lighting device to illuminate at a first brightness, a third actuation signal may cause the smart lighting device to illuminate at a second brightness, and a fourth actuation signal may cause the smart lighting device to turn off Other examples are also possible.

The processors of the lighting service provider server device and the processor(s) of the smart lighting device(s) may perform the operations of blocks 712-724 as described.

In block 810, the processor of the customer service provider server device may update the data record with the current state, status, and/or activity of the smart lighting device(s).

In optional block 812, the processor of the customer service provider server device may send one or more smart lighting device status messages to the smart switch (or smart switches). The status message(s) may include a status of the one or more smart lighting devices, an indication of the success or failure of executing the smart lighting device instruction by the one or more smart lighting devices, and/or other information about the smart lighting device(s). In embodiments in which two or more smart switches are associated with the smart lighting device(s), the processor of the customer service provider server device may send the smart lighting device status to the two or more smart switches.

In optional block 814, the processor of the smart switch(es) may receive the smart lighting device status message(s).

In optional block 834, the processor of the smart switch(es) may generate an indication of the smart lighting status. In some embodiments, the processor of each smart switch may generate an indication of the smart lighting device status, such as a visual indication, a sound indication, a tactile indication, or combinations thereof. In some embodiments, the processor of each smart switch may store the smart lighting device status in a memory.

Figure 9:
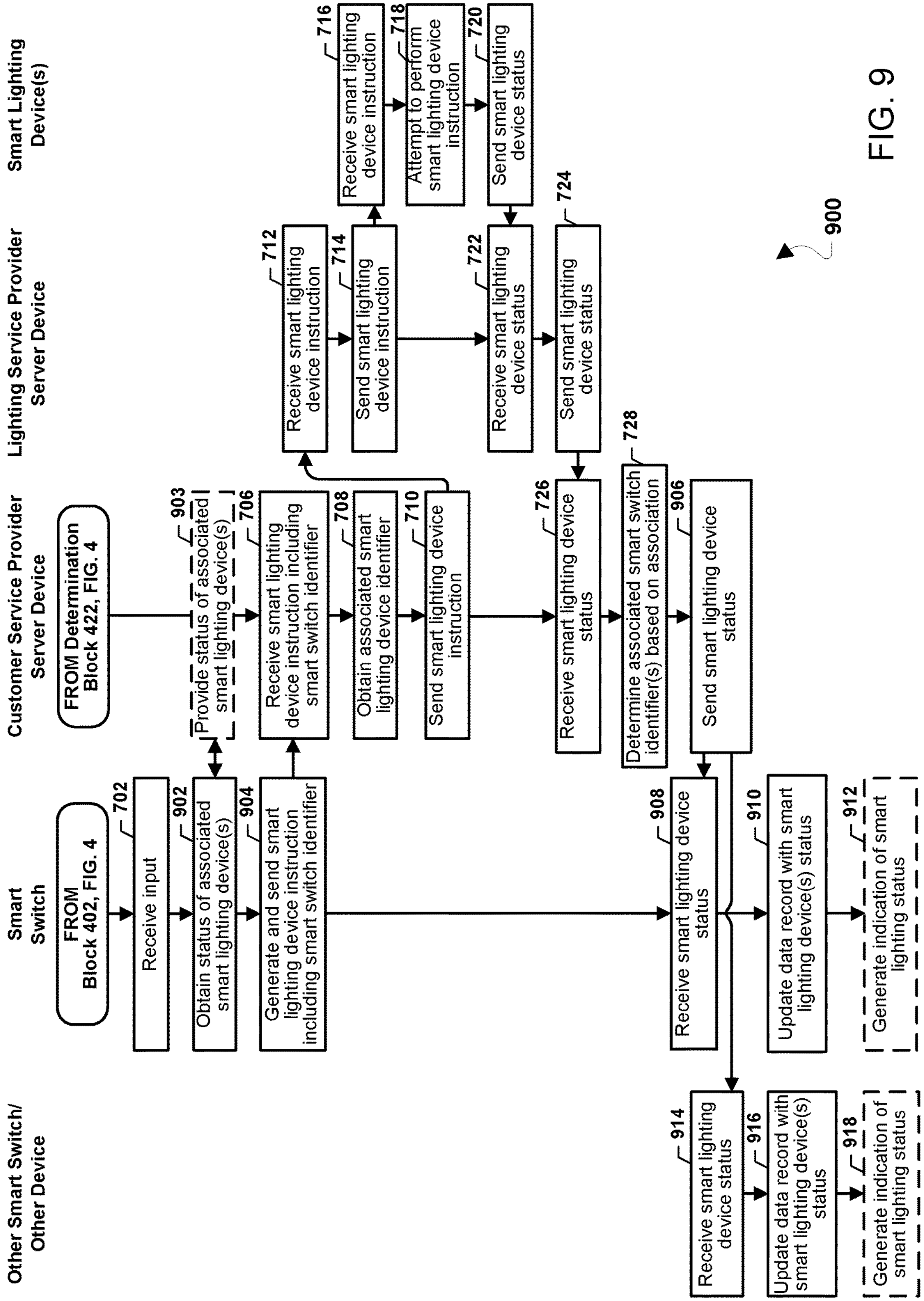
FIG. 9 is a process flow diagram illustrating a method for controlling a smart lighting device according to some embodiments.

FIG. 9 is a process flow diagram illustrating a method 900 for controlling a smart lighting device 104 according to some embodiments. With reference to FIGS. 1-9, the method 900 may be implemented by a processor (e.g., the general processor 202) of a smart switch (e.g., the smart switches 102, 200), a processor of a server device of a server device (e.g., a processor of the customer service provider server device 122, the lighting service provider device 124), a processor of a smart lighting device (e.g., the smart lighting device 104), and a processor of another smart switch or another device (e.g., the mobile computing device 112, a "smart speaker" device, or another suitable device). In blocks 702 and 706-728, the processors of the smart switch, the customer service provider server device, the lighting service provider server device, and the smart lighting device may perform operations of like-numbered blocks of the method 700 as described.

In various embodiments, the method 900 may enable the control of one or more smart lighting devices by two or more smart switches and/or other devices (e.g., a mobile computing device, a "smart speaker" device or another smart home control unit, or another suitable device). In some embodiments, one or more smart switches (as well as one or more other devices) may maintain a data record of a status of the smart lighting device(s). A smart switch (or other device) may generate a smart lighting device instruction based on the current operational state of the smart lighting device(s), and may send the generated smart lighting device instruction to the customer service provider server device. In some embodiments, two or more smart switches may be configured to control the same smart lighting device(s) using the method 900.

In block 902, the processor of the smart switch may obtain a status of one or more smart lighting devices. The status of the smart lighting device(s) may reflect a current operation or activity of the smart lighting devices, such as illuminating at a steady brightness, increasing in brightness, decreasing in brightness, pulsing, flashing, on standby/not currently illuminating, and the like. In some embodiments, the processor of the smart switch may obtain the status of the one or more smart lighting devices from a memory of the smart switch (e.g., from its stored data record). In some embodiments, the processor of the smart switch may obtain the status of the one or more smart lighting devices from the customer service provider server device. For example, the processor of the smart switch may send a query or other suitable message to the customer service provider server device to obtain the status of the one or more smart lighting devices.

In optional block 903, the processor of the customer service provider server device may provide to the smart switch status information of the one or more smart lighting devices. For example, the processor of the customer service provider server device may provide the status of the one or more smart lighting devices in response to a query or other suitable message from the smart switch.

In block 904, the processor of the smart switch may generate and send a smart lighting device instruction to the customer service provider server device. In some embodiments, the processor of the smart switch may generate the smart lighting device instruction in response to a received input (e.g., block 702) at a physical switch (e.g., the switch 216) of the smart switch. In some embodiments, the smart lighting device instruction may include the smart switch identifier. In some embodiments, the smart lighting device instruction may include one or more smart lighting device identifiers. In some embodiments, the smart lighting device instruction may include a specific instruction for the smart lighting device. For example, the smart lighting device instruction may include an instruction to turn on, turn off, dim, brighten, change a color, change a hue, change an illumination pattern, change an illumination rhythm, or another suitable smart lighting device instruction.

The processors of the customer service provider server device, the lighting service provider server device, and the processor(s) of the smart lighting device(s) may perform the operations of blocks 706-728 as described.

In block 906, the processor of the customer service provider server device may send one or more smart lighting device status messages to the smart switch, and to another smart switch or another device. In some embodiments, the processor of the customer service provider server device may determine the smart switches or other devices to send the status message(s) based on the data record stored in the customer service provider server device of associations between the smart lighting device(s) and the smart switches and other devices. The status message(s) may include a status of the one or more smart lighting devices, an indication of the success or failure of executing the smart lighting device instruction by the one or more smart lighting devices, and/or other information about the smart lighting device(s). In embodiments in which two or more smart switches are associated with the smart lighting device(s), the processor of the customer service provider server device may send the smart lighting device status to the two or more smart switches.

In block 908, the processor of the smart switch may receive the smart lighting device status message(s).

In block 908, the processor of the smart switch may update the data record stored in the smart switch with the status of the smart lighting device(s).

In optional block 910, the processor of the smart switch may generate an indication of the status of the smart lighting device(s).

In block 914, the processor of another smart switch and/or another device may receive the smart lighting device status message(s).

In block 916, the processor of the other smart switch and/or other device may update the data record stored in the smart switch with the status of the smart lighting device(s).

In optional block 918, the processor of the other smart switch and/or other device may generate an indication of the status of the smart lighting device(s).

Figure 10:
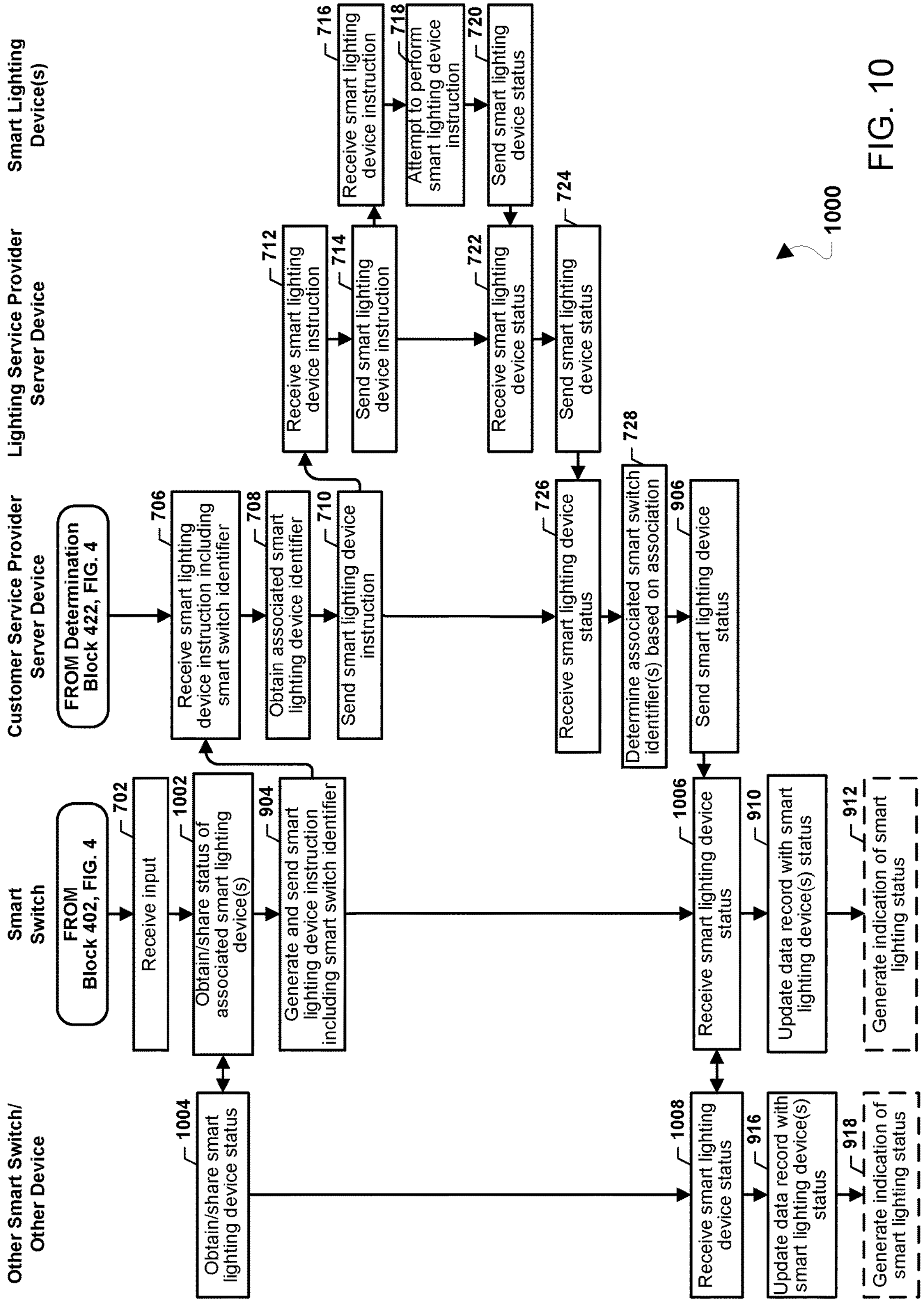
FIG. 10 is a process flow diagram illustrating a method for controlling a smart lighting device according to some embodiments.

FIG. 10 is a process flow diagram illustrating a method 1000 for controlling a smart lighting device 104 according to some embodiments. With reference to FIGS. 1-10, the method 1000 may be implemented by a processor (e.g., the general processor 202) of a smart switch (e.g., the smart switches 102, 200), a processor of a server device of a server device (e.g., a processor of the customer service provider server device 122, the lighting service provider device 124), a processor of a smart lighting device (e.g., the smart lighting device 104), and a processor of another smart switch or another device (e.g., the mobile computing device 112, a "smart speaker" device, or another suitable device). In blocks 702, 706-728, and 902-918, the processors of the smart switch, the customer service provider server device, the lighting service provider server device, the smart lighting device, and other smart switches or other devices may perform operations of like-numbered blocks of the methods 700 and 900 as described.

In various embodiments, the method 1000 may enable the control of one or more smart lighting devices by two or more smart switches and/or other devices (e.g., a mobile computing device, a "smart speaker" device or another smart home control unit, or another suitable device). In some embodiments, one or more smart switches (as well as one or more other devices) may maintain a data record of a status of the smart lighting device(s). In some embodiments, each of the smart switches and other device may communicate with each other over a communication link (e.g., the communication links 126 and 128 in FIG. 1). In some embodiments, the smart switch(es) and other device(s) may share information about the status of one or more smart lighting devices. In some embodiments, one smart switch may be configured as a "master" device that may provide information to other smart switches and devices, and other smart switch(es) and/or other device(s) may be configured as "slave" devices that receive information from the "master" device. In some embodiments, each of the smart switch(s) and other device(s) may be configured to operate as peers and share information, including smart lighting device status information. In various embodiments, a smart switch (or other device) may generate a smart lighting device instruction based on the current operational state of the smart lighting device(s), and may send the generated smart lighting device instruction to the customer service provider server device. In some embodiments, two or more smart switches may be configured to control the same smart lighting device(s) using the method 1000.

In block 1002, the processor of the smart switch may obtain a status of one or more smart lighting devices. In some embodiments, the processor of the smart switch may obtain the smart lighting device status information from a data record stored in the smart switch. In some embodiments, the processor of the smart switch may share the smart lighting device status information with another smart switch or another device. In some embodiments, the processor of the smart switch may obtain the smart lighting device status information from another smart switch or another device.

In block 1004, the processor of another smart switch or another device may obtain and/or share the smart lighting device status information from or with the smart switch, as well as from or with another smart switch or another device. The operations of blocks 1002 and 1004 enable multiple smart switch(es) and device(es) to share smart lighting device status information. The status of the smart lighting device(s) may reflect a current operation or activity of the smart lighting devices, such as illuminating at a steady brightness, increasing in brightness, decreasing in brightness, pulsing, flashing, on standby/not currently illuminating, and the like.

The processors of the customer service provider server device, the lighting service provider server device, and the processor(s) of the smart lighting device(s) may perform the operations of blocks 706-728, 904, and 906 as described.

In block 906, the processor of the customer service provider server device may send one or more smart lighting device status messages to the smart switch, and to another smart switch or another device. In some embodiments, the processor of the customer service provider server device may determine the smart switches or other devices to send the status message(s) based on the data record stored in the customer service provider server device of associations between the smart lighting device(s) and the smart switches and other devices. The status message(s) may include a status of the one or more smart lighting devices, an indication of the success or failure of executing the smart lighting device instruction by the one or more smart lighting devices, and/or other information about the smart lighting device(s). In embodiments in which two or more smart switches are associated with the smart lighting device(s), the processor of the customer service provider server device may send the smart lighting device status to the two or more smart switches.

In block 1006, the processor of the smart switch may receive the smart lighting device status message(s), and may share, send, or exchange the smart lighting device status information with other smart switch(es) and/or other device(s).

In block 1008, the processor(s) of other smart switch(es) and/or other device(s) may receive the smart lighting device status information from the smart switch. In some embodiments, the processor(s) of other smart switch(es) and/or other device(s) may send the smart lighting device status information to another smart switch or another device.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300, 400, 500, 600, 700, 800, 900, and 1000 may be substituted for or combined with one or more operations of the methods 300, 400, 500, 600, 700, 800, 900, and 1000, and vice versa.

Figure 11:
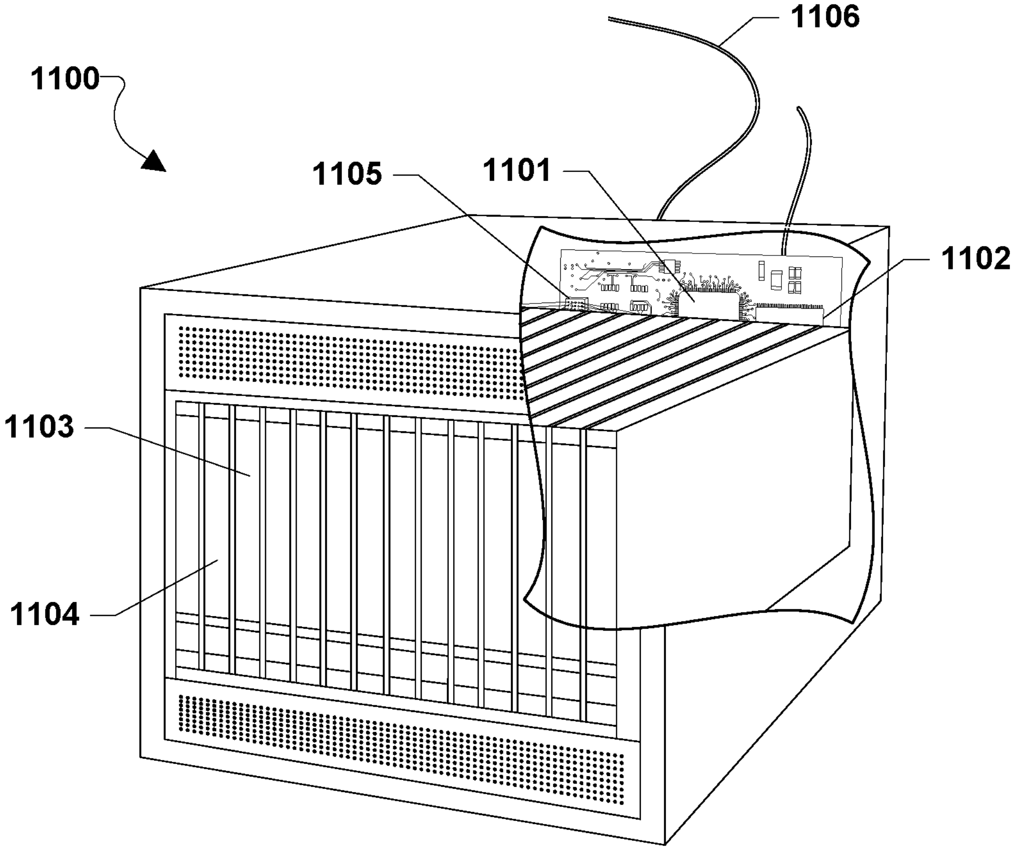
FIG. 11 is a component diagram of an example server device suitable for use with the some aspects.

Various aspects may be implemented on any of a variety of commercially available server devices, such as the server device 1100 illustrated in FIG. 11. Such a server device 1100 may include a processor 1101 coupled to volatile memory 1102 and a large capacity nonvolatile memory, such as a disk drive 1103. The server device 1100 may also include a floppy disc drive, compact disc (CD) or DVD disc drive 1104 coupled to the processor 1101. The server device 1100 may also include network access ports 1106 coupled to the processor 1101 for establishing data connections with a network connection circuit 1105 and a communication network coupled to other communication system network elements.

The processor 1101 may be any programmable microprocessor, microcomputer or multiple processor chip or chips that can be configured by software instructions (applications) to perform a variety of functions, including the functions of the various aspects described below. In some server devices 1100, multiple processors 1101 may be provided, such as one or more processors dedicated to communication functions and one or more processors dedicated to performing other functions or running other applications. Software applications may be stored in the non-volatile memory 1103 before they are accessed and loaded into the processor 1101. The processor 1101 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process may be stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavyweight process that includes multiple lightweight processes or threads, which are processes that share all or portions of their context (e.g., address space, stack, permissions, and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, various embodiments are not intended to be limited to the embodiments shown herein but are to be accorded the widest scope consistent with the following claims and the principles and novel features disclosed herein.

What is claimed is:

1. A smart switch, comprising:

a communication interface;

a memory; and a processor coupled to the communication interface and the memory and configured with processor-executable instructions to perform operations comprising:

sending to a customer service provider server device, a smart switch identifier of the smart switch for incorporation into a data record in the customer service provider server device in association with a smart lighting device identifier of a smart lighting device at a customer premises;

generating a smart lighting device instruction for a smart lighting device, wherein the generated smart lighting device instruction includes the smart switch identifier; and sending the generated smart lighting device instruction to the customer service provider server device for transmission to the smart lighting device identifier based on the association.

2. The smart switch of claim 1, wherein the smart switch is disposed to substantially cover a wall switch at the customer premises.

3. The smart switch of claim 2, wherein the smart switch further comprises a receptacle portion formed to maintain a position of the wall switch in a powered-on position.

4. The smart switch of claim 1, further comprising a physical switch coupled to the processor, and wherein the processor is configured with processor-executable instructions to perform operations such that generating a smart lighting device instruction for a smart lighting device, wherein the generated smart lighting device instruction includes the smart switch identifier, comprises:

generating an actuation signal for the smart lighting device in response to an input at the physical switch to enable the customer service provider server device to generate the smart lighting instruction for the smart lighting device.

5. The smart switch of claim 1, wherein the processor is configured with processor-executable instructions to perform operations such that generating a smart lighting device instruction for a smart lighting device, wherein the generated smart lighting device instruction includes the smart switch identifier, comprises:

obtaining a status of the smart lighting device; and generating a smart lighting device instruction for the smart lighting device based on the obtained status of the smart lighting device.

6. The smart switch of claim 5, wherein the processor is configured with processor-executable instructions to perform operations such that obtaining a status of the smart lighting device comprises:

obtaining a status of the smart lighting device from a second smart switch.

7. The smart switch of claim 5, wherein the processor is configured with processor-executable instructions to perform operations such that obtaining a status of the smart lighting device comprises:

obtaining a status of the smart lighting device from the customer service provider server device.

8. The smart switch of claim 1, wherein the processor is configured with processor-executable instructions to perform operations further comprising:

receiving from the customer service provider server device a smart lighting device status responsive to the smart lighting instruction; and updating the data record with the smart lighting device status.

9. The smart switch of claim 8, wherein the processor is configured with processor-executable instructions to perform operations further comprising:

sending the smart lighting device status to one or more other devices associated with the smart lighting device.

10. The smart switch of claim 1, wherein the processor is configured with processor-executable instructions to perform N-way control operations.

11. A method of controlling a smart lighting device, comprising:

sending, by a processor of a smart switch, to a customer service provider server device, a smart switch identifier of the smart switch for incorporation into a data record in the customer service provider server device in association with a smart lighting device identifier of a smart lighting device at a customer premises;

generating, by the processor of the smart switch, a smart lighting device instruction for a smart lighting device, wherein the generated smart lighting device instruction includes the smart switch identifier; and sending, by the processor of the smart switch, to the customer service provider server device, the generated smart lighting device instruction to the smart lighting device for transmission to the smart lighting device identifier based on the association.

12. The method of claim 11, wherein generating a smart lighting device instruction for a smart lighting device comprises:

generating, by the processor of the smart switch, an actuation signal for the smart lighting device in response to an input at the physical switch to enable the customer service provider server device to generate the smart lighting instruction for the smart lighting device.

13. The method of claim 11, wherein generating, by the processor of the smart switch, a smart lighting device instruction for a smart lighting device, comprises:

obtaining, by the processor of the smart switch, a status of the smart lighting device; and generating, by the processor of the smart switch, a smart lighting device instruction for the smart lighting device based on the obtained status of the smart lighting device.

14. The method of claim 13, wherein obtaining, by the processor of the smart switch, a status of the smart lighting device comprises:

obtaining, by the processor of the smart switch, a status of the smart lighting device from a second smart switch.

15. The method of claim 13, wherein obtaining, by the processor of the smart switch, a status of the smart lighting device comprises:

obtaining, by the processor of the smart switch, a status of the smart lighting device from the customer service provider server device.

16. Method of claim 11, further comprising:

receiving, by the processor of the smart switch, from the customer service provider server device a smart lighting device status responsive to the smart lighting instruction; and updating, by the processor of the smart switch, the data record with the smart lighting device status.

17. The method of claim 16, further comprising:

sending, by the processor of the smart switch, the smart lighting device status to one or more other devices associated with the smart lighting device.

18. A customer service provider server device, comprising:

a communication interface;

a memory; and a processor coupled to the communication interface and the memory and configured with processor-executable instructions to perform operations comprising:

generating a data record that includes a smart switch identifier of a smart switch at a customer premises;

generating an association between the smart switch identifier and a smart lighting device identifier of a smart lighting device at the customer premises;

storing the smart switch identifier and the association in a data record in the memory;

receiving from the smart switch a smart lighting device instruction including the smart switch identifier;

obtaining the smart lighting device identifier from the memory based on the association; and sending the smart lighting instruction to the smart lighting device based on the smart lighting device identifier obtained based on the association.

19. The customer service provider server device of claim 18, wherein the processor is configured with processor-executable instructions to perform operations such that:

the smart lighting device instruction received from the smart switch comprises an actuation signal; and wherein sending the smart lighting instruction to the smart lighting device based on the smart lighting device identifier obtained based on the association comprises:

obtaining a status of the smart lighting device; and generating and sending the smart lighting instruction to the smart lighting device based on the actuation signal and the obtained status of the smart lighting device.

20. The customer service provider server device of claim 18, wherein the processor is configured with processor-executable instructions to perform operations further comprising:

receiving from the smart switch a registration message including an indication of the smart lighting device with which the smart switch is to be associated;

sending to a lighting service provider server device the indication of the smart lighting device; and receiving the smart lighting device identifier from a lighting service provider server device based on the indication of the smart lighting device.

21. The customer service provider server device of claim 20, wherein the processor is configured with processor-executable instructions to perform operations such that receiving the smart lighting device identifier from a lighting service provider server device based on the indication of the smart lighting device comprises:

receiving a plurality of smart lighting device identifiers from the lighting service provider server device based on the indication of the smart lighting device.

22. The customer service provider server device of claim 21, wherein the processor is configured with processor-executable instructions to perform operations such that generating the association between the smart switch identifier and a smart lighting device identifier of a smart lighting device at the customer process comprises:

generating the association between the smart switch identifier and the plurality of smart lighting device identifiers.

23. The customer service provider server device of claim 18, wherein the processor is configured with processor-executable instructions to perform operations further comprising:

receiving from the smart switch a registration message including an indication of a location of the smart switch in the customer premises;

sending to a lighting service provider server device the indication of the smart switch location in the customer premises; and receiving the plurality of smart lighting device identifiers from the lighting service provider server device based on the indication of the smart switch location in the customer premises.

24. The customer service provider server device of claim 18, wherein the processor is configured with processor-executable instructions to perform operations further comprising:

receiving from the smart switch a registration message including an indication of the smart lighting device with which the smart switch is to be associated; and receiving a plurality of smart lighting device identifiers from a lighting service provider server device based on the indication of the smart lighting device.

25. The customer service provider server device of claim 18, wherein the processor is configured with processor-executable instructions to perform operations further comprising:

receiving a smart lighting device status in response to sending the smart lighting instruction to the smart lighting device;

determining based on the association in the data record the smart switch identifier; and sending the smart lighting device status to the determined associated smart switch.

26. The customer service provider server device of claim 18, wherein the processor is configured with processor-executable instructions to perform operations further comprising:

sending the smart lighting device status to one or more other devices associated with the smart lighting device.

27. The customer service provider server device of claim 18, wherein the processor is configured with processor-executable instructions to perform operations such that storing the smart switch identifier and the association in a data record in the memory comprises:

storing the smart switch identifier and the association in a data record comprising one or more of a plurality of smart switch identifiers and a plurality of associations.

28. The customer service provider server device of claim 18, wherein the processor is configured with processor-executable instructions to perform N-way control operations.

29. A method of controlling a smart lighting device, comprising:

generating, by a processor of a customer service provider server device, a data record that includes a smart switch identifier of a smart switch at a customer premises;

generating, by the processor of a customer service provider server device, an association between the smart switch identifier and a smart lighting device identifier of a smart lighting device at the customer premises;

storing, by the processor of a customer service provider server device, the smart switch identifier and the association in a data record in the memory;

receiving, by the processor of a customer service provider server device, from the smart switch a smart lighting device instruction including the smart switch identifier;

obtaining, by the processor of a customer service provider server device, the smart lighting device identifier from the memory based on the association; and sending, by the processor of a customer service provider server device, the smart lighting instruction to the smart lighting device based on the smart lighting device identifier obtained based on the association.

30. The method of claim 29, wherein:

the smart lighting device instruction received from the smart switch comprises an actuation signal; and wherein sending the smart lighting instruction to the smart lighting device based on the smart lighting device identifier obtained based on the association comprises:

obtaining a status of the smart lighting device; and generating and sending the smart lighting instruction to the smart lighting device based on the actuation signal and the obtained status of the smart lighting device.

31. The method of claim 29, further comprising:

receiving from the smart switch a registration message including an indication of the smart lighting device with which the smart switch is to be associated;

sending to a lighting service provider server device the indication of the smart lighting device; and receiving the smart lighting device identifier from a lighting service provider server device based on the indication of the smart lighting device.

32. The method of claim 31, wherein receiving the smart lighting device identifier from a lighting service provider server device based on the indication of the smart lighting device comprises:

receiving a plurality of smart lighting device identifiers from the lighting service provider server device based on the indication of the smart lighting device.

33. The method of claim 32, wherein generating the association between the smart switch identifier and a smart lighting device identifier of a smart lighting device at the customer process comprises:

generating the association between the smart switch identifier and the plurality of smart lighting device identifiers.

34. The method of claim 29, further comprising:

receiving from the smart switch a registration message including an indication of a location of the smart switch in the customer premises;

sending to a lighting service provider server device the indication of the smart switch location in the customer premises; and receiving the plurality of smart lighting device identifiers from the lighting service provider server device based on the indication of the smart switch location in the customer premises.

35. The method of claim 29, further comprising:

receiving from the smart switch a registration message including an indication of the smart lighting device with which the smart switch is to be associated; and receiving a plurality of smart lighting device identifiers from a lighting service provider server device based on the indication of the smart lighting device.

36. The method of claim 29, further comprising:

receiving a smart lighting device status in response to sending the smart lighting instruction to the smart lighting device;

determining based on the association in the data record the smart switch identifier; and sending the smart lighting device status to the determined associated smart switch.

37. The method of claim 29, further comprising:

sending the smart lighting device status to one or more other devices associated with the smart lighting device.

38. The method of claim 29, wherein storing the smart switch identifier and the association in a data record in the memory comprises:

storing the smart switch identifier and the association in a data record comprising one or more of a plurality of smart switch identifiers and a plurality of associations.

39. A system for controlling a smart lighting device, comprising:

a smart switch, comprising:

a communication interface;

a memory; and a processor coupled to the communication interface and the memory and configured with processor-executable instructions to perform operations comprising:

sending to a customer service provider server device, a smart switch identifier of the smart switch;

generating a smart lighting device instruction for a smart lighting device, wherein the generated smart lighting device instruction includes the smart switch identifier; and sending the generated smart lighting device instruction to the customer service provider server device for transmission to the smart lighting device identifier based on the association; and a customer service provider server device, comprising:

a communication interface;

a memory; and a processor coupled to the communication interface and the memory and configured with processor-executable instructions to perform operations comprising:

generating a data record that includes the smart switch identifier of a smart switch at a customer premises;

generating an association between the smart switch identifier and a smart lighting device identifier of a smart lighting device at the customer premises;

storing the smart switch identifier and the association in a data record in the memory;

receiving from the smart switch the smart lighting device instruction including the smart switch identifier;

obtaining the smart lighting device identifier from the memory based on the association; and sending the smart lighting instruction to the smart lighting device based on the smart lighting device identifier obtained based on the association.

40. The system of claim 39, wherein the processor of the smart switch is configured with processor-executable instructions to perform operations such that obtaining a status of the smart lighting device comprises:

obtaining a status of the smart lighting device from a second smart switch.

41. The system of claim 39, wherein the processor of the smart switch is configured with processor-executable instructions to perform operations such that obtaining a status of the smart lighting device comprises:

obtaining a status of the smart lighting device from the customer service provider server device.

42. The system of claim 39, wherein the processor of the smart switch is configured with processor-executable instructions to perform operations further comprising:

receiving from the customer service provider server device a smart lighting device status responsive to the smart lighting instruction; and updating the data record with the smart lighting device status.

43. The system of claim 42, wherein the processor of the smart switch is configured with processor-executable instructions to perform operations further comprising:

sending the smart lighting device status to one or more other devices associated with the smart lighting device.

44. The system of claim 39, wherein the processor of the customer service provider server device is configured with processor-executable instructions to perform operations further comprising:

sending the smart lighting device status to one or more other devices associated with the smart lighting device.

45. The system of claim 39, wherein the system further comprises at least a second smart switch to form a plurality of smart switches, wherein the processor of the customer service provider server device is configured with processor-executable instructions to perform operations such that storing the smart switch identifier and the association in a data record in the memory comprises:

storing the smart switch identifier and the association in a data record comprising one or more of the plurality of smart switch identifiers and a plurality of associations.

46. A non-transitory processor readable storage medium having stored thereon processor-executable instructions configured to cause a processor of a smart switch to perform operations comprising:

sending to a customer service provider server device, a smart switch identifier of the smart switch for incorporation into a data record in the customer service provider server device in association with a smart lighting device identifier of a smart lighting device at a customer premises;

generating a smart lighting device instruction for a smart lighting device, wherein the generated smart lighting device instruction includes the smart switch identifier; and sending the generated smart lighting device instruction to the customer service provider server device for transmission to the smart lighting device identifier based on the association.

47. A non-transitory processor readable storage medium having stored thereon processor-executable instructions configured to cause a processor of a customer service provider server device to perform operations comprising:

generating a data record that includes a smart switch identifier of a smart switch at a customer premises;

generating an association between the smart switch identifier and a smart lighting device identifier of a smart lighting device at the customer premises;

storing the smart switch identifier and the association in a data record in the memory;

receiving from the smart switch a smart lighting device instruction including the smart switch identifier;

obtaining the smart lighting device identifier from the memory based on the association; and sending the smart lighting instruction to the smart lighting device based on the smart lighting device identifier obtained based on the association.

* * * * *

UNITED STATES PATENT AND TRADEMARK OFFICE

CERTIFICATE OF CORRECTION

PATENT NO. : 10,798,801 B2
APPLICATION NO. : 16/019292
DATED : October 6, 2020
INVENTOR(S) : Dhananjay Lal It is certified that error appears in the above-identified patent and that said Letters Patent is hereby corrected as shown below:

In the Claims

Claim 1, Column 27, Line 3, please delete the word "identifier"

Claim 11, Column 28, Line 11, please delete the word "identifier"

Claim 39, Column 32, Lines 12 and 13, please delete the word "identifier"

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*